United States Patent
Schliwa-Bertling et al.

(10) Patent No.: US 11,800,408 B2
(45) Date of Patent: Oct. 24, 2023

(54) METHOD FOR ADVANCE NOTIFICATION OF CHANGES TO NETWORK QOS CAPABILITIES

(71) Applicant: Telefonaktiebolaget LM Ericsson (publ), Stockholm (SE)

(72) Inventors: Paul Schliwa-Bertling, Ljungsbro (SE); Massimo Condoluci, Solna (SE); Ylva Timner, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 17/268,090

(22) PCT Filed: Jul. 2, 2019

(86) PCT No.: PCT/SE2019/050655
§ 371 (c)(1),
(2) Date: Feb. 12, 2021

(87) PCT Pub. No.: WO2020/036523
PCT Pub. Date: Feb. 20, 2020

(65) Prior Publication Data
US 2021/0314820 A1   Oct. 7, 2021

Related U.S. Application Data

(60) Provisional application No. 62/718,769, filed on Aug. 14, 2018.

(51) Int. Cl.
*H04L 47/74* (2022.01)
*H04L 47/762* (2022.01)
(Continued)

(52) U.S. Cl.
CPC ........... *H04W 28/24* (2013.01); *H04W 24/10* (2013.01); *H04W 28/0268* (2013.01); *H04W 36/22* (2013.01)

(58) Field of Classification Search
CPC . H04W 28/24; H04W 24/10; H04W 28/0268; H04W 36/22
See application file for complete search history.

(56) References Cited

U.S. PATENT DOCUMENTS 8,634,423 B1   1/2014  Olding et al.
2012/0307631 A1  12/2012  Yang et al.
(Continued)

FOREIGN PATENT DOCUMENTS

CN    101883392 A   11/2010
CN    105636062 A    6/2016
(Continued)

OTHER PUBLICATIONS

LG Electronics, "New Use Case: Adjustment of configuration of Platooning Application", 3GPP TSG-SA WG1 #82, S1-181727, Dubrovnik, Croatia, May 7-11, 2018, 1-3.
(Continued)

*Primary Examiner* — Jeffrey M Rutkowski
*Assistant Examiner* — Christopher Nguyen
(74) *Attorney, Agent, or Firm* — Murphy, Bilak & Homiller, PLLC

(57) ABSTRACT

Embodiments include methods for notifying of changes to an access network's (AN) compliance with a QoS requirement for a data flow between an application server and an application associated with a user equipment served by the AN. Such embodiments include receiving, from a core network (CN), a first safeguard time associated with the QoS requirement and representing an amount of time required, prior to AN non-compliance with the QoS requirement, to adapt the application for safe operation during the AN non-compliance. Embodiments also include determining that, at approximately a first instance in the future, the AN is likely to be non-compliant with the QoS requirement; and
(Continued)

sending, to the CN, a first notification indicating a likelihood of future AN non-compliance with the QoS requirement. The first notification is sent at least the first safeguard time before the first instance. Embodiments include complementary methods performed by CNs and application servers.

26 Claims, 14 Drawing Sheets

(51) Int. Cl.
    *H04L 47/80* (2022.01)
    *H04L 47/70* (2022.01)
    *H04L 47/83* (2022.01)
    *H04L 47/2425* (2022.01)
    *H04W 28/24* (2009.01)
    *H04W 24/10* (2009.01)
    *H04W 28/02* (2009.01)
    *H04W 36/22* (2009.01)

(56) References Cited

U.S. PATENT DOCUMENTS

| | | |
|---|---|---|
| 2015/0350918 A1 | 12/2015 | Rashid et al. |
| 2018/0063219 A1 | 3/2018 | Ljung et al. |

FOREIGN PATENT DOCUMENTS

| | | | | |
|---|---|---|---|---|
| JP | 2008141261 A | 6/2008 | | |
| JP | 2021510467 A | 4/2021 | | |
| WO | 2013171364 A1 | 11/2013 | | |
| WO | 2013171365 A1 | 11/2013 | | |
| WO | 2017067572 A1 | 4/2017 | | |
| WO | WO-2017067572 A1 * | 4/2017 | ........... | H04L 47/127 |
| WO | WO-2017176399 A1 * | 10/2017 | ............ | H04L 47/20 |
| WO | WO-2019081026 A1 * | 5/2019 | ............ | H04W 28/24 |
| WO | WO-2019081027 A1 * | 5/2019 | ........ | H04W 28/0268 |
| WO | 2019139752 A1 | 7/2019 | | |

OTHER PUBLICATIONS

Nokia, et al., "23.502: 5G QoS: Notification Control", SA WG2 Meeting #124, S2-178674, (revision of S2-17xxxx), Reno, Nevada, USA, Nov. 27-Dec. 1, 2017, 1-4.
5GAA, "TR-200055", 5G Automotive Association; Working Group System Architecture and Solution Development; 5GS Enhancements for Providing Predictive QoS in C-V2X, May 22, 2020, 1-60.
Ericsson, et al., "Solution for KI#3: QoS Support for eV2X over Uu interface", 3GPP SA WG2 Meeting #128, S2-186987 (revision of 6976 was 6409), Vilnius, Lithuania, Jul. 2-6, 2018, 1-4.
3GPP, "3GPP TS 23.503 V15.2.0", 3rd Generation Partnership Project; Technical Specification Group Services and System Aspects; Policy and Charging Control Framework for the 5G System; Stage 2 (Release 15), Jun. 2018, 1-67.
3GPP, "3GPP TS 38.413 V0.3.0", 3rd Generation Partnership Project; Technical Specification Group Radio Access Network; NG Radio Access Network (NG-RAN); NG Application Protocol (NGAP) (Release 15), Aug. 2017, 1-85.
3GPP, "3rd Generation Partnership Project; Technical Specification Group Radio Access Network; NG-RAN; F1 application protocol (F1AP) (Release 15)", 3GPP TS 38.473 V15.5.0, Mar. 2019, 1-198.
3GPP, "3rd Generation Partnership Project; Technical Specification Group Radio Access Network; NG-RAN; Architecture description (Release 15)", 3GPP TS 38.401 V15.5.0, Mar. 2019, 1-39.
3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.
3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.
3GPP, "3rd Generation Partnership Project; Technical Specification Group Radio Access Network; Study on New Radio Access Technology; Radio Access Architecture and Interfaces (Release 14)", 3GPP TR 38.801 V1.2.0, Feb. 2017, 1-90.
3GPP, "3rd Generation Partnership Project; Technical Specification Group Services and System Aspects; 3GPP System Architecture Evolution (SAE); Security architecture (Release 15)", 3GPP TS 33.401 V15.8.0, Jun. 2019, 1-163.
3GPP, "3rd Generation Partnership Project; Technical Specification Group Services and System Aspects; Procedures tor the 5G System; Stage 2 (Release 15)", 3GPP TS 23.502 V15.2.0, Jun. 2018, 1-308.
3GPP, "3rd Generation Partnership Project; Technical Specification Group Services and System Aspects; System Architecture for the 5G System; Stage 2 (Release 15)", 3GPP TS 23.501 V15.2.0, Jun. 2018, 1-217.
Ericsson, "Way Forward for Notification Control", 3GPP TSG-RAN WG3 Meeting #AH-1801, R3-180553, Sophia Antipolis, France, Jan. 22-26, 2018, 1-4.
Huawei, et al., "Notification Control", 3GPP TSG-RAN WG2 NR Ad hoc 1801, R2-1800261, resubmission of R2-1712391, Vancouver, Canada, Jan. 22-26, 2018, 1-2.
3GPP, "3GPP Ts 22.261 V16.4.0", 3rd Generation Partnership Project; Technical Specification Group Services and System Aspects; Service requirements for the 5G system; Stage 1 (Release 16), Jun. 2018, 1-55.
Nec, "Further discussion on Notification Control and QoS Flows", 3GPP TSG-RAN WG3#99-Bis, R3-182020, Sanya, China, Apr. 16-20, 2018, 1-3.
3GPP, "3GPP TR 22.886 V15.2.0", 3rd Generation Partnership Project; Technical Specification Group Services and System Aspects; Study on enhancement of 3GPP Support for 5G V2X Services (Release 15), Jun. 2018, 1-58.

* cited by examiner

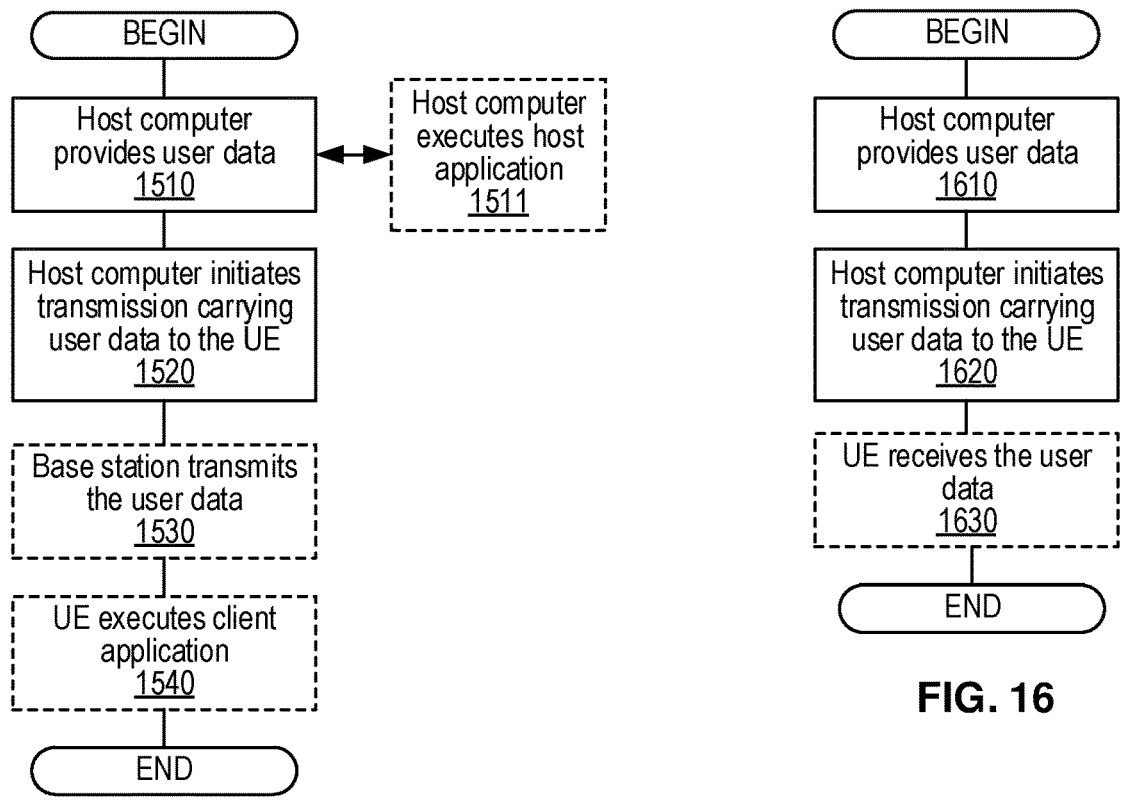
FIG. 15
FIG. 16
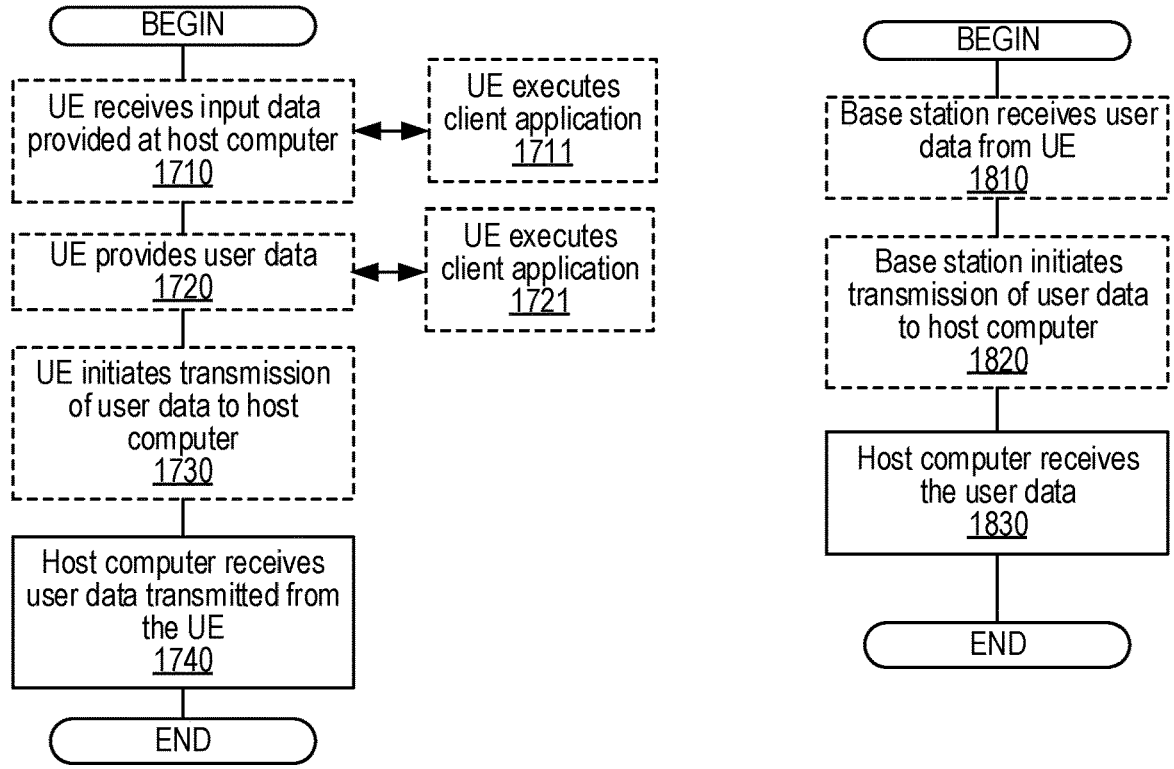
FIG. 17
FIG. 18

METHOD FOR ADVANCE NOTIFICATION OF CHANGES TO NETWORK QOS CAPABILITIES

TECHNICAL FIELD

The present application relates generally to the field of wireless communication networks, and more specifically to devices, methods, and computer-readable media that facilitate safe usage of applications that require guaranteed network quality of service (QoS) and advance notification of changes to network QoS capabilities.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non-Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

In addition, the SRBs (e.g., SRB1) can carry RRC messages for the establishment, modification, and/or release of radio bearers used to carry user data. These radio bearers are referred to as "data radio bearers" (DRBs), and each can be associated with various quality-of-service (QoS) parameters such as, e.g., a guaranteed bit rate (GBR).

In 3GPP, a study item on a new radio interface for 5G has recently been completed and 3GPP has now continued with the effort to standardize this new radio interface, often abbreviated by NR (New Radio).

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMF) in the 5GC 198 via respective NG-C interfaces. Similarly, gNBs 100, 150 can be connected to one or more User Plane Functions (UPFs) in 5GC 198 via respective NG-U interfaces.

Although not shown, in some deployments 5GC 198 can be replaced by an Evolved Packet Core (EPC), which conventionally has been used together with LTE E-UTRAN. In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect to the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 1 (and described in 3GPP TS 38.401 and 3GPP TR 38.801) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. DUs (e.g., gNB-DUs 120, 130) are decentralized logical nodes that host lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;

F1 supports the exchange of signaling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user equipment (UE) associated information and non-UE associated information;

F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of gNB-CU into a CU-CP function (including RRC and PDCP for signaling radio bearers) and CU-UP function (including PDCP for user plane). The CU-CP and CU-UP functions can communicate with each other using the E1-AP protocol over the E1 interface. In addition to the new E1 interface, the F1 interface can be logically separated into CP (F1-C) and UP (F1-U) functionalities. FIG. 2 illustrates an exemplary split CU-UP/CP architecture. The following scenarios for the split CU-UP/CP architecture are defined in 3GPP TR 38.806:

CU-CP and CU-UP centralized;
CU-CP distributed and CU-UP centralized; and
CU-CP centralized and CU-UP distributed.

FIG. 3 shows another high-level view of an exemplary 5G network architecture, including NG-RAN 399 and 5GC 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a,b) via respective NG-C interfaces and to the UPF (User Plane Function) 340 (e.g., UPFs 340a,b) via respective NG-U interfaces. The AMFs and UPFs can also interface to other network functions (NFs) in 5GC 398, as discussed in more detail below.

As discussed above with respect to FIG. 1, each of the gNBs 310 can support the NR radio interface, including FDD, TDD, or a combination thereof. In contrast, each of ng-eNBs 320 supports the LTE radio interface but, unlike conventional LTE eNBs, connect to the 5GC via the NG interface.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This SBA model, which further adopts principles like modularity, reusability and self-containment of NFs, can enable deployments to take advantage of the latest virtualization and software technologies.

In general, a NF service is a type of capability exposed by one NF (Service Producer) to other authorized NFs (Service Consumers) through a service-based interface (SBI). A NF service may support one or more NF service operation(s). Access to these various services can be provided, for example, by Hyper Text Transfer Protocol/Representational State Transfer (HTTP/REST) application programming interfaces (APIs). In general, the various services are self-contained functionalities that can be changed and modified in an isolated manner without affecting other services. Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify".

FIG. 4 shows an exemplary non-roaming 5G reference architecture with service-based interfaces and various 3GPP-defined NFs within the Control Plane (CP), including:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface; and
Unified Data Management (UDM) with Nudm interface.

Similar to the HSS in LTE/EPC networks, UDM supports generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

5GC services will likely be built in a stateless way, such that the business logic and data context will be separated. This means that the services store their context externally in a proprietary database. This can facilitate various cloud infrastructure features like auto-scaling or auto-healing. The NRF allows every NF to discover the services offered by other NFs, and Data Storage Functions (DSF) allow every NF to store its context. In addition, the NEF provides exposure of capabilities and events of the 5GC to application functions (AFs) within the 5GC and outside of the 5GC. For example, NEF provides a service that allows an AF to provision specific subscription data (e.g., expected UE behavior) for various UEs.

While LTE was primarily designed for user-to-user communications, 5G/NR networks are intended to support high single-user data rates (e.g., 1 Gb/s) as well as large-scale, machine-to-machine (M2M) communication involving short, bursty transmissions from many different devices that share the frequency bandwidth. The 5G/NR radio standards are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC service requires a low latency and high reliability transmission but perhaps for moderate data rates.

In order to support vehicular applications or remote control of machines (e.g., in a factory), 5G networks must provide some guaranteed Quality of Service (QoS) for the data traffic generated by these applications (referred to as "QoS flows"). This QoS guarantee can be in terms of bitrates, packet delays, and/or packet error rates. More specific use cases and services requirements for such applications are specified in 3GPP TS 22.886 (v15.2.0) and 3GPP TS 22.261 (v16.4.0).

Furthermore, 3GPP TS 23.502 (v15.2.0) specifies a "notification control" procedure whereby the NG-RAN indicates to the 5GC that the guaranteed flow bitrate (GFBR) for an active QoS flow can no longer be fulfilled, thus enabling the possibility for the 5GC to react (e.g., by triggering a modification or a removal of the QoS flow) to a change of QoS capabilities and/or to inform the application as soon as communicated by the NG-RAN.

In scenarios where correct operation of such applications is critical for human safety, this necessary "safe operation" can depend on the guaranteed QoS provided by the 5G network for the underlying QoS flows. As such, it can be important for devices to take necessary actions toward a safety-critical application (e.g., disabling machine usage) before the QoS is no longer guaranteed by the network. As another example, in vehicular scenarios, an application may need to adjust some driving-related features (e.g., vehicle speed, following distance, etc.) before a change to the network's QoS capabilities.

The "notification control" feature discussed above is a reaction-based approach, since the notification is sent after the RAN becomes unable to fulfill the guaranteed performance (e.g., GFBR) of a certain QoS flow. As such, it can be insufficient and/or inadequate to meet the stringent, safety-driven requirements discussed above.

SUMMARY

Exemplary embodiments disclosed herein address these and other problems, issues, and/or drawbacks of existing solutions by introducing a "safeguard time" to provide advance awareness of the instance traffic flow QoS can no longer be guaranteed by the network, as well as when the guaranteed QoS can be resumed. As such, this novel approach can enable and/or facilitate safe usage of applications that require guaranteed QoS with joint in-advance notification about changes of network's QoS capabilities.

Exemplary embodiments include various methods and/or procedures for notifying of changes to access network (AN) compliance with a quality-of-service (QoS) requirement for a data flow between an application server and an application associated with a user equipment (UE) served by the AN. Such exemplary embodiments can be implemented, for example, by an access network (e.g., radio access network or component thereof, such as base station, eNB, gNB, etc.).

The exemplary method and/or procedure can include receiving, from the CN, a first safeguard time associated with the QoS requirement for the data flow. The first safeguard time (e.g., safe-guard-time_disable) can represent an amount of time required by an application server (AF), prior to AN non-compliance with the QoS requirement, to adapt the application for safe operation during the AN non-compliance. In some embodiments, the exemplary method and/or procedure can also include receiving, from the CN, a second safeguard time associated with the QoS requirement for the data flow. The second safeguard time (e.g., safe-guard-time_enable) can represent an amount of time by an application server (AF), prior to AN re-compliance with the QoS requirement after non-compliance, to adapt the application for safe operation after the AN re-compliance.

The exemplary method and/or procedure can also include determining that, at approximately a first instance in the future, the AN is likely to be non-compliant with the QoS requirement. The exemplary method and/or procedure can also include sending, to the CN, a first notification indicating a likelihood of future AN non-compliance with the QoS requirement. The first notification can be sent at least the first safeguard time before the first instance.

In some embodiments, the exemplary method and/or procedure can also include determining that, at approximately a second instance in the future, the AN is likely to be re-compliant with the QoS requirement. The exemplary method and/or procedure can also include sending, to the CN, a second notification indicating a likelihood of future AN re-compliance with the QoS requirement after non-compliance. The second notification can be sent at least the second safeguard time before the second instance.

Other exemplary embodiments include various methods and/or procedures for monitoring access network (AN) compliance with a quality-of-service (QoS) requirement for a data flow between an application server (AF) and an application associated with a user equipment (UE) served by the AN, according to various exemplary embodiments of the present disclosure. Such exemplary embodiments can be implemented, for example, by a core network (CN, e.g., 5GC or component(s) thereof) coupled to the AN (e.g., NG-RAN).

The exemplary method and/or procedure can include receiving, from the AF, a first safeguard time associated with the QoS requirement for the data flow. The first safeguard time (e.g., safe-guard-time_disable) can represent an amount of time required, prior to AN non-compliance with the QoS requirement, to adapt the application for safe operation during the AN non-compliance. The exemplary method and/or procedure can also include sending the first safeguard time to the AN.

In some embodiments, the exemplary method and/or procedure can also include receiving, from the AF, a second safeguard time associated with the QoS requirement for the data flow. The second safeguard time (e.g., safe-guard-time_enable) can represent an amount of time required, prior to AN re-compliance with the QoS requirement after non-compliance, to adapt the application for safe operation after the AN re-compliance. In such embodiments, the exemplary method and/or procedure can also include sending the second safeguard time to the AN.

In some embodiments, the exemplary method and/or procedure can also include receiving, from the AN, a first notification indicating that, at approximately a first instance in the future, the AN is likely to be non-compliant with the QoS requirement. In such embodiments, the exemplary method and/or procedure can also include sending the first notification to the AF. For example, the first notification can be sent at least the first safeguard time before the first instance.

In some embodiments, the exemplary method and/or procedure can also include receiving, from the AN, a second notification indicating that, at approximately a second instance in the future, the AN is likely to be re-compliant with the QoS requirement. In such embodiments, the exemplary method and/or procedure can also include sending the second notification to the AF. For example, the second notification can be sent at least the second safeguard time before the second instance.

Other exemplary embodiments include other methods and/or procedures for monitoring an access network (AN) compliance with a quality-of-service (QoS) requirement for a data flow between the application server and an application associated with a user equipment (UE) served by the AN. Such exemplary embodiments can be implemented, for example, by an application server (e.g., an AF) coupled to a core network (e.g., 5GC) and an access network (e.g., NG-RAN).

The exemplary method and/or procedure can include determining a first safeguard time associated with the QoS requirement for the data flow. The first safeguard time (e.g., safe-guard-time_disable) can represent an amount of time required, prior to AN non-compliance with the QoS requirement, to adapt the application for safe operation during the AN non-compliance. The exemplary method and/or procedure can also include sending the determined first safeguard time to a core network (CN).

In some embodiments, the exemplary method and/or procedure can also include determining a second safeguard time associated with the QoS requirement for the data flow. The second safeguard time (e.g., safe-guard-time_enable) can represent an amount of time required, prior to AN re-compliance with the QoS requirement after non-compliance, to adapt the application for safe operation during the AN re-compliance. In such embodiments, the exemplary method and/or procedure can also include sending the determined second safeguard time to the CN.

In some embodiments, the exemplary method and/or procedure can also include receiving, from the CN, a first notification indicating that, at approximately a first instance in the future, the AN is likely to be non-compliant with the QoS requirement. The first notification can be received at least the first safeguard time before the first instance.

In such embodiments, the exemplary method and/or procedure can also include, in response to the first notification and prior to the first instance, controlling (e.g., adapting) at least one service of the application to facilitate safe operation of the application subsequent to first instance. In some embodiments, this can include disabling or reducing the operating margin for at least one of the following: the at least one service, a subset of the at least one service, and the entire application.

In some embodiments, the exemplary method and/or procedure can also include receiving, from the CN, a second notification indicating that, at approximately a second instance in the future, the AN is likely to be re-compliant with the QoS requirement. The second notification can be received at least the second safeguard time before the second instance.

In such embodiments, the exemplary method and/or procedure can also include, in response to the second notification and prior to the second instance, controlling (e.g., adapting) at least one service of the application to facilitate safe operation of the application subsequent to second instance. In some embodiments, this can include enabling or increasing the operating margin for at least one of the following: the at least one service, a subset of the at least one service, and the entire application.

Other exemplary embodiments include access networks (ANs, e.g., E-UTRAN, NG-RAN, or component(s) thereof), core networks (CNs, e.g., EPC, 5GC, or component(s) thereof), or application servers (e.g., AFs) configured to perform operations corresponding to any of the exemplary methods and/or procedures described herein. Other exemplary embodiments include non-transitory, computer-readable media storing program instructions that, when executed by at least one processor, configure such access networks, core networks, and application servers to perform operations corresponding to any of the exemplary methods and/or procedures described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIG. 5, which includes

FIGS. 15-18 are flow diagrams illustrating various exemplary methods and/or procedures implemented in a communication system, according to various exemplary embodiments of the present disclosure.

DETAILED DESCRIPTION

Figure 1:
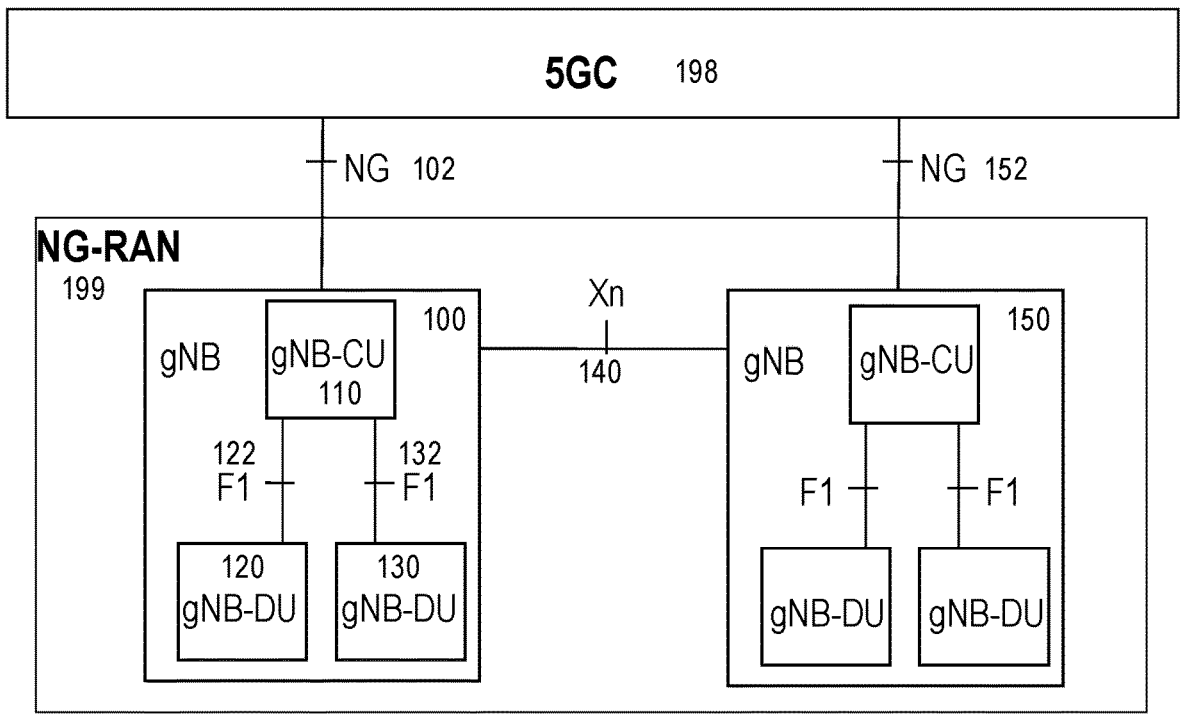
FIGS. 1-3 are block diagrams illustrating various aspects of an exemplary 5G network architecture.
Figure 2:
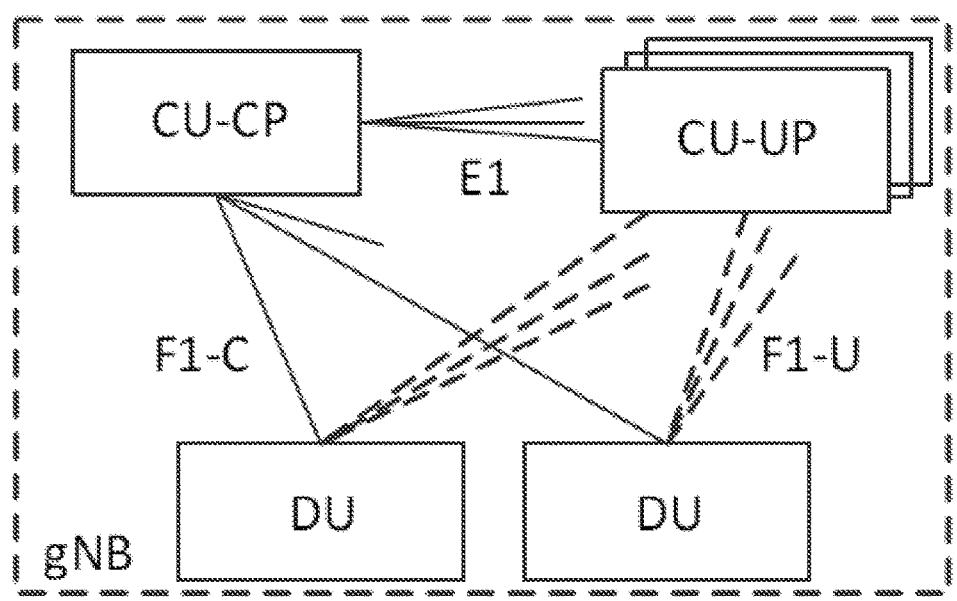
Figure 3:
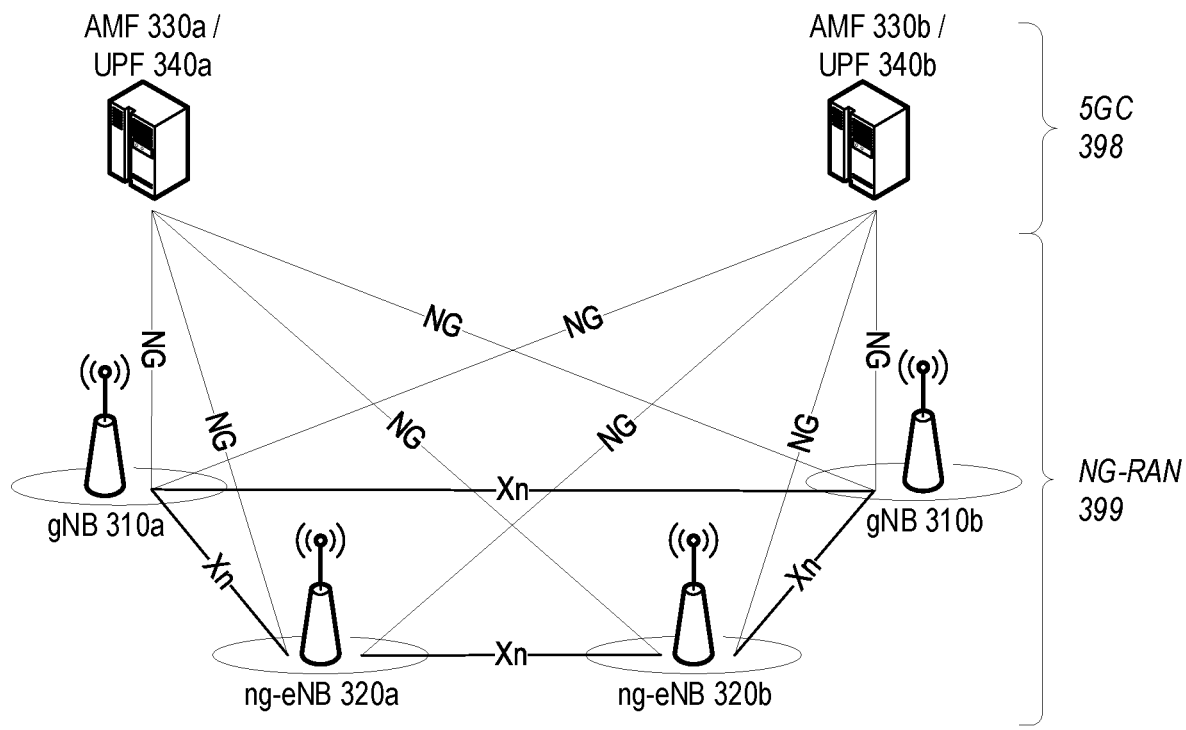
Figure 4:
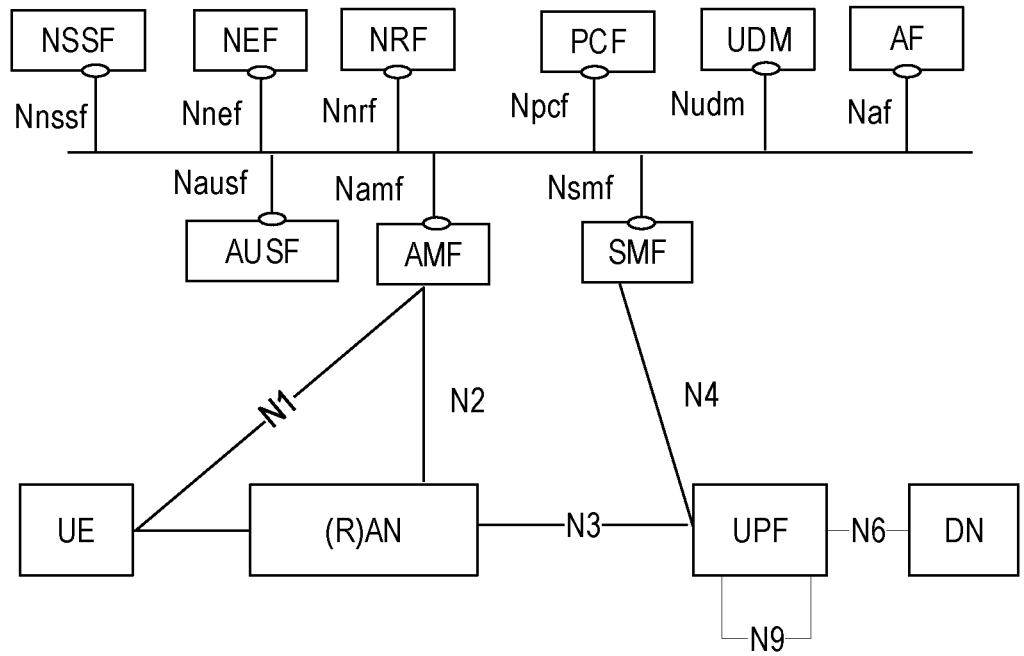
FIG. 4 shows an exemplary non-roaming 5G reference architectures with service-based interfaces and various network functions (NFs), as further described in 3GPP TS 23.501.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicating wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

3GPP TS 23.501 (v15.2.0) specifies support for configuring a notification from NG-RAN to 5GC to be triggered when QoS targets (e.g., GFBR) cannot be sustained, as well as when the QoS targets can be provided again. As further described in 3GPP TS 23.502, a GBR QoS flow can be associated with a Notification control parameter, which indicates whether notifications are requested from the RAN when the GFBR can no longer (or again) be fulfilled for a QoS Flow during the lifetime of the QoS Flow. If, for a given GBR QoS Flow, notification control is enabled and the NG-RAN determines that the GFBR cannot be fulfilled, RAN shall send a notification towards the 5GC Session Management Function (SMF) and keep the QoS Flow (i.e., while the NG-RAN is not delivering the requested GFBR for this QoS Flow), unless specific conditions at the NG-RAN require the release of the NG-RAN resources for this GBR QoS Flow (e.g., due to Radio link failure or RAN internal congestion.

Furthermore, the RAN should try to fulfil the GFBR, but upon receiving a notification from the RAN that the GFBR cannot be fulfilled, the SMF may forward the Notification to the Policy Control Function (PCF) (as described in 3GPP TS 23.503). 5GC may initiate N2 signaling to modify or remove the QoS Flow, and the 5GC shall report to the impacted application server (referred to as "application function" or "AF" for short) if that AF requests to be notified on the event that the QoS targets cannot be fulfilled. When applicable, NG-RAN sends a new notification, informing SMF that the GFBR can be fulfilled again. After a configured time, NG-RAN may send a subsequent notification that the GFBR cannot be fulfilled. Notification control is signaled to the NG-RAN.

In addition, during a handover, a source NG-RAN should inform a target NG-RAN about those QoS Flows for which the source NG-RAN has sent a notification that the GFBR cannot be fulfilled. This can trigger the target NG-RAN to send a notification when the GFBR can again be fulfilled for those QoS Flows that are successfully handed over. After handover, as needed, the target NG-RAN can send a subsequent notification that the GFBR cannot be fulfilled.

As such, current notification control solutions (e.g., as specified in 3GPP standards) neither provide nor facilitate advance notice, to an application, of an expected non-compliance with a QoS guarantee provided by the network to the application. Similarly, current solutions neither provide nor facilitate advance notice, to the application, of an expected resumption of compliance with a QoS guarantee provided by the network to the application. This drawback can negatively impact the functionality and/or safety of such applications, particularly when safe operation of these applications is dependent upon the QoS guarantee.

Exemplary embodiments of the present disclosure address these and other problems and/or shortcomings of prior solutions by providing additional "safeguard time" information to be associated with a QoS flow. For example, the application can indicate, to the network via a "safe-guard-time_disable" indicator and/or value, that the application needs to become aware in advance of the actual time instance where the system predicts that QoS can no longer be guaranteed, in order to disable a service of the application, a subset of the service, or the entire application. Likewise, the application can indicate, via a "safe-guard-time_enable" indicator and/or value, that the application needs to become aware in advance of the actual time instance where the system predicts that QoS can again be guaranteed, in order to enable the service, a subset of the service, or the entire application.

In some embodiments, these exemplary indicators and/or values can be provided by an AF associated with the application (such as defined in 3GPP TS 23.503), or can be configured in the PCF (e.g., in relation to a specific slice, based on the NSSAI, associated with a specific DNN, or in relation to a specific subscription).

In some embodiments, the value(s) of safe-guard-time_disable and/or safe-guard-time enable can be negotiated between the application server (e.g., AF) and the network. For example, the application server can provide the network with desired values(s) and the network can provide a feedback with a particular selected value or with one or more values supported by the network.

In some embodiments, the network can further utilize the values of 'safe-guard-time_disable' and 'safe-guard-time_enable' provided by the application server when determining and/or computing network-specific values of 'safe-guard-time_disable' and 'safe-guard-time_enable' that are subsequently delivered to related network nodes, e.g., SMF, AMF, AN/RAN, etc. As used herein, the term "(R)AN" refers to an access network (AN) which can be a radio access network (RAN) or a non-radio access network (e.g., wired access network).

After receiving such indication(s) and/or values, the related network node(s) can configure the sending of notifications of guaranteed QoS compliance change (e.g., non-compliance and/or re-compliance) to occur in advance of the actual guaranteed QoS compliance change. For example, the related network node(s) can configure a notification of guaranteed QoS non-compliance to be sent to the application a safe-guard-time_disable period before the actual non-compliance occurs. As another example, the related network node(s) can configure a notification of guaranteed QoS re-compliance to be sent to the application a safe-guard-time_enable period before the actual re-compliance occurs. Accordingly, the application receiving such notifications can act in a timely manner to disable, enable, and/or change operation conditions (e.g., operating margins) of a service, a subset of the service, or the entire application, thereby facilitating safe operation.

Figure 5A:
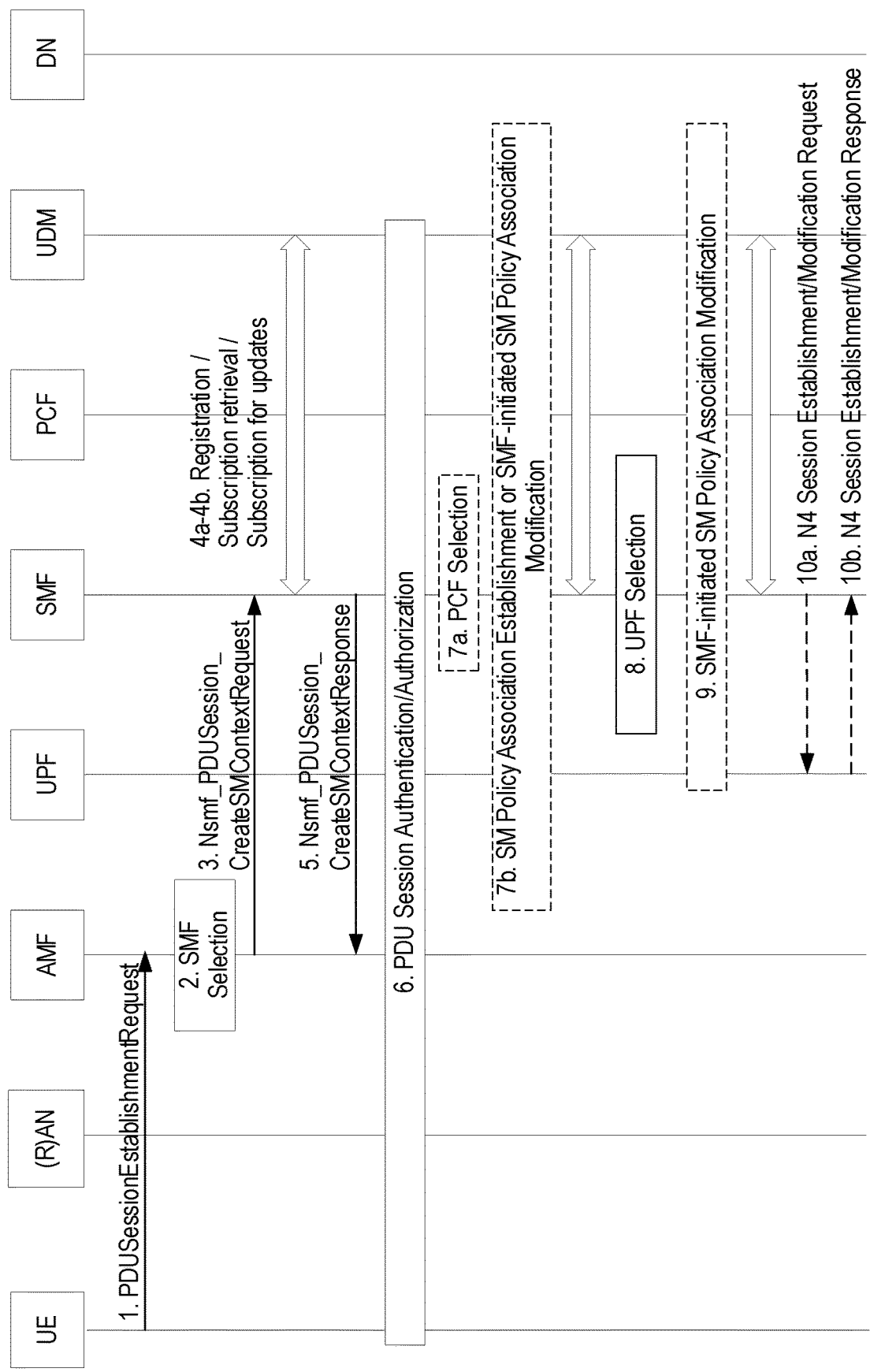
FIGS. 5A and 5B, shows a signal flow diagram of an exemplary PDU Session setup procedure as currently specified in 3GPP TS 23.502, according to various exemplary embodiments of the present disclosure.
Figure 5B:
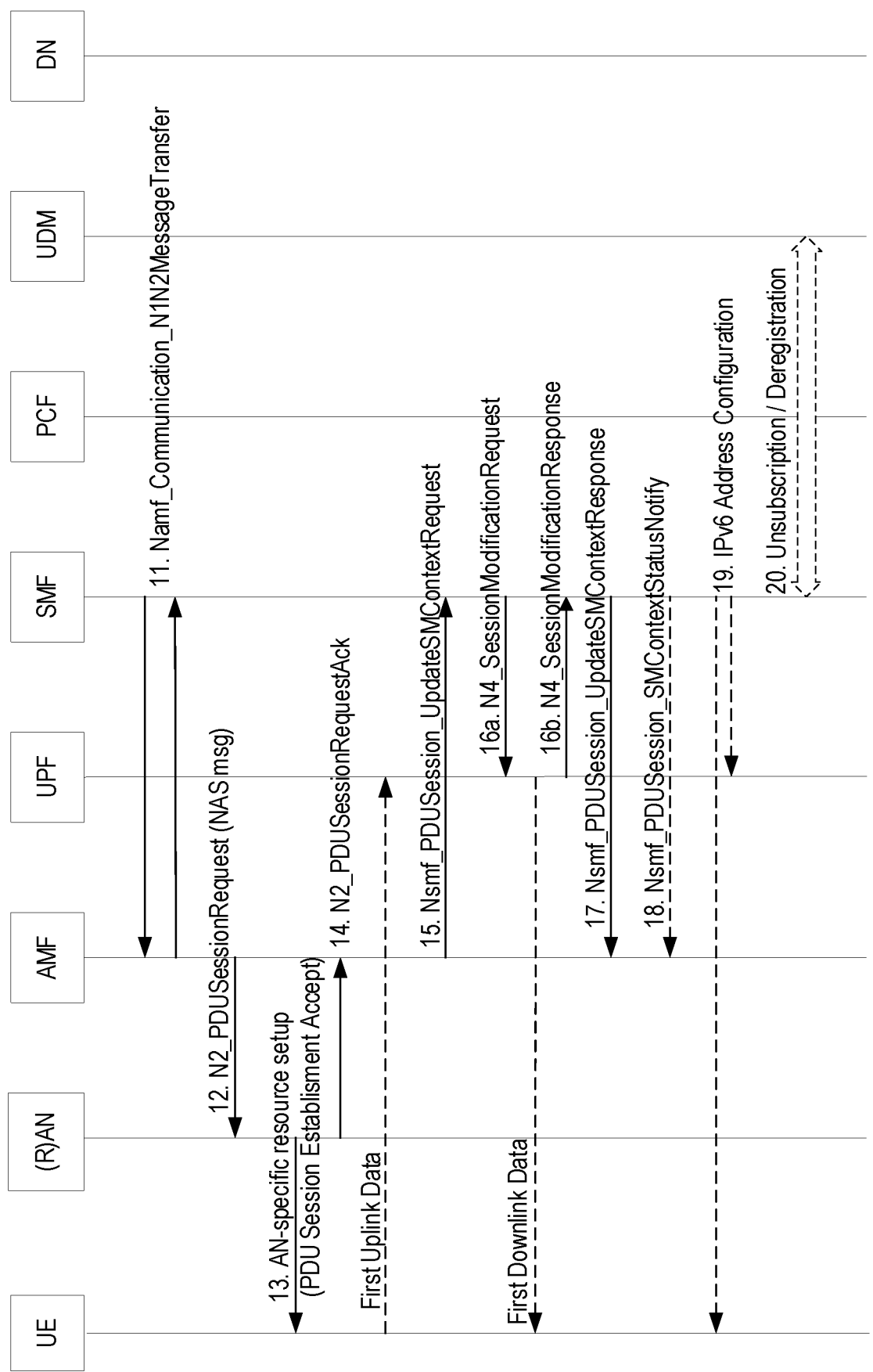

Such exemplary embodiments can be used in the context of various existing procedures involving notification control that are specified for 5GC/NG-RAN in 3GPP standards. To illustrate this by example, FIG. 5 (which includes FIGS. 5A and 5B) shows a signal flow diagram of a PDU Session setup procedure as currently specified in 3GPP TS 23.502 (v15.2.0). This the safeguard time information can be introduced into the portions of this exemplary procedure that configure notification control, as explained in more detail below, thereby facilitating safe operation of applications.

More specifically, FIG. 5 shows a PDU Session establishment procedure in the non-roaming and roaming with local breakout (LBO) cases. The procedure can be used for various purposes including establishing a new PDU Session; handover of a PDN Connection in EPS to PDU Session in 5GS without N26 interface; switching an existing PDU Session between non-3GPP access and 3GPP access; and requesting a PDU Session for emergency services. In case of roaming, the Access and Mobility Management Function (AMF) determines if a PDU Session is to be established in LBO or Home Routing. In the case of LBO, the procedure is identical to non-roaming except that AMF, SMF, User Plane Function (UPF), and PCF are located in the visited network. PDU Sessions for Emergency services are never established in Home Routed mode.

The operations shown in the exemplary procedure of FIG. 5 are labelled numerically, but this numbering is used only to facilitate clarity in the following description. Moreover, the numerical order is merely exemplary, and the order of the various operations can be rearranged in various embodiments. Dashed lines indicate optional operations whose performance may depend on one or more conditions. The procedure shown assumes that the UE has already registered to the AMF and, unless the UE is Emergency registered, the AMF has already retrieved the user subscription data from the UDM.

In order to establish a new PDU Session, the UE generates a new PDU Session ID. In operation 1, the UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, SGSM Capability PCO, SM PDU DN Request Container, Number off Packet Filters.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in 3GPPTS 23.501 clause 5.15.7.2. The UE shall not trigger a PDU Session establishment for a PDU Session corresponding to a LADN when the UE is outside the area of availability of the LADN.

When Emergency service is required and an Emergency PDU Session is not already established, a UE shall initiate the UE Requested PDU Session Establishment procedure with a Request Type indicating "Emergency Request". The Request Type indicates "Existing Emergency PDU Session" if the request refers to an existing PDU Session for Emergency services switching between 3GPP access and non- 3GPP access or to a PDU Session handover from an existing PDN connection for Emergency services in the LTE Evolved Packet Core (EPC).

The 5GSM Core Network Capability is provided by the UE and handled by SMF as defined in 3GPP TS 23.501 clause 5.4.4b. The 5GSM Capability also includes the UE Integrity Protection Maximum Data Rate. The Number Of Packet Filters indicates the number of supported packet filters for signalled QoS rules for the PDU Session that is being established. The number of packet filters indicated by the UE is valid for the lifetime of the PDU Session.

The NAS message sent by the UE is encapsulated by the AN in a N2 message towards the AMF that should include User location information and Access Type Information. The PDU Session Establishment Request message may contain SM PDU DN Request Container containing information for the PDU Session authorization by the external DN.

The UE includes the S-NSSAI from the Allowed NSSAI of the current access type. If the Mapping of Allowed NSSAI was provided to the UE, the UE shall provide both the S-NSSAI from the Allowed NSSAI and the corresponding S-NSSAI from the Mapping of Allowed NSSAI. If the procedure is triggered for SSC mode 3 operation, the UE shall also include the Old PDU Session ID which indicates the PDU Session ID of the on-going PDU Session to be released, in NAS message. The Old PDU Session ID is an optional parameter which is included only in this case.

The AMF receives from the AN the NAS SM message together with User Location Information (e.g., Cell Id in case of the NG-RAN). If the UE is establishing a PDU session for IMS, and the UE is configured to discover the P-CSCF address during connectivity establishment, the UE shall include an indicator that it requests a P-CSCF IP address(es) within the SM container. The PS Data Off status is included in the PCO in the PDU Session Establishment Request message.

In operation 2, the AMF determines that the received message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI for the requested PDU Session either according to the UE subscription, if it contains only one default S-NSSAI, or based on operator policy. When the NAS Message contains an S-NSSAI but it does not contain a DNN, the AMF determines the DNN for the requested PDU Session by selecting the default DNN for this S-NSSAI if the default DNN is present in the UE's Subscription Information; otherwise the serving AMF selects a locally configured DNN for this S-NSSAI. If the DNN provided by the UE is not supported by the network and AMF cannot select an SMF by querying NRF, based on operator policy, the AMF shall reject the NAS Message containing PDU Session Establishment Request from the UE with an appropriate cause.

The AMF selects an SMF as described in 3GPP TS 23.501. If the Request Type indicates "Initial request" or the request is due to handover from EPS or from non-3GPP access serving by a different AMF, the AMF stores an association of the S-NSSAI(s), the DNN, the PDU Session ID, the SMF ID as well as the Access Type of the PDU Session.

If the Request Type is "initial request" and if the Old PDU Session ID indicating the existing PDU Session is also contained in the message, the AMF selects an SMF as described in clause 4.3.5.2 and stores an association of the new PDU Session ID, the S-NSSAI, the selected SMF ID as well as Access Type of the PDU Session.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case. The AMF updates the Access Type stored for the PDU Session.

If the Request Type indicates "Existing PDU Session" referring to an existing PDU Session moved between 3GPP access and non-3GPP access, then if the S-NSSAI of the PDU Session is present in the Allowed NSSAI of the target access type, the PDU Session Establishment procedure can be performed in the following cases:
- the SMF ID (that includes the PLMN ID that the SMF belongs to) corresponding to the PDU Session ID and the AMF belong to the same PLMN;
- the SMF ID corresponding to the PDU Session ID belongs to the HPLMN;

Otherwise, the AMF shall reject the PDU Session Establishment Request with an appropriate reject cause. The AMF shall also reject a request coming from a UE when the UE is registered for Emergency services and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead. The AMF stores the Access Type of the PDU Session. If the Request Type indicates "Emergency Request" or "Existing Emergency PDU Session", the AMF selects the SMF as described in 3GPP TS 23.501 clause 5.16.4.

In operation 3, either a Nsmf_PDUSession_CreateSMContext Request message or a Nsmf_PDUSession_UpdateSMContext Request message is sent by the AMF to SMF. If the AMF does not have an association with an SMF for the PDU Session ID provided by the UE (e.g., when Request Type indicates "initial request"), the AMF invokes the Nsmf_PDUSession_CreateSMContext Request, but if the AMF already has an association with an SMF for the PDU Session ID provided by the UE (e.g., when Request Type indicates "existing PDU Session"), the AMF invokes the Nsmf_PDUSession_UpdateSMContext Request. The message includes elements SUPI, DNN, S-NSSAI(s), PDU Session ID, AMF ID, Request Type, PCF ID, Priority Access, N1 SM container (PDU Session Establishment Request.

The AMF sends the S-NSSAI from the Allowed NSSAI to the SMF. For roaming scenario, the AMF also sends the corresponding S-NSSAI from the Mapping Of Allowed NSSAI to the SMF. The AMF ID is the UE's GUAMI which uniquely identifies the AMF serving the UE. The AMF forwards the PDU Session ID together with the N1 SM container containing the PDU Session Establishment Request received from the UE. The GPSI shall be included if available at AMF. The AMF determines Access Type and RAT Type based on the Global RAN Node ID associated with the N2 interface. The AMF may include a PCF ID, which identifies the H-PCF in the non-roaming case and the V-PCF in the LBO roaming case.

The AMF provides the PEI instead of the SUPI when the UE has registered for Emergency services without providing a SUPI. The PEI is defined in 3GPP TS 23.501 clause 5.9.3.

In case the UE has registered for Emergency services with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the AMF determines that the DNN corresponds to an LADN then the AMF provides the "UE presence in LADN service area" that indicates if the UE is IN or OUT of the LADN service area. If the Old PDU Session ID is included in step 1, and if the SMF is not to be reallocated, the AMF also includes Old PDU Session ID in the Nsmf_PDUSession_CreateSMContext Request. DNN Selection Mode is determined by the AMF. It indicates whether an explicitly subscribed DNN has been provided by the UE in its PDU Session Establishment Request. The SMF may use DNN Selection Mode when deciding whether to accept or reject the UE request.

The AMF includes Priority Access indication if it received an Establishment Cause as part of AN parameters during the Registration procedure or Service Request procedure where the Establishment Cause indicates high priority access. The SMF uses Priority Access indication to determine if the UE request is subject to exemption from NAS level congestion control.

In the local breakout (LBO) case, if the SMF (in the VPLMN) is not able to process some part of the N1 SM information that Home Routed Roaming is required, and the SMF responds to the AMF that it is not the right SMF to handle the N1 SM message by invoking Nsmf_PDUSession_CreateSMContext Response service operation. The SMF includes a proper N11 cause code triggering the AMF to proceed with home routed case. The procedure starts again at step 2 of clause 4.3.2.2.2.

In operation 4, if Request Type in operation 3 indicated neither "Emergency Request" nor "Existing Emergency PDU Session," and if the SMF has not yet registered for this PDU Session ID, then the SMF registers with the UDM by sending Nudm_UECM_Registration (SUPI, DNN, PDU Session ID) message for a given PDU Session.

As a result, the UDM stores following information: SUPI, SMF identity, SMF address and the associated DNN and PDU Session ID. The UDM may further store this information in UDR by Nudr_DM_Update (SUPI, Subscription Data, UE context in SMF data). If Session Management Subscription data for corresponding SUPI, DNN and S-NSSAI is not available, then SMF retrieves the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI). UDM may get this information from UDR by Nudr_DM_Query (SUPI, Subscription Data, Session Management Subscription data, DNN, S-NSSAI) and may subscribe to notifications from UDR for the same data by Nudr_DM_subscribe. The S-NSSAI used with the UDM is the S-NSSAI with value for the HPLMN The SMF may use DNN Selection Mode when deciding whether to retrieve the Session Management Subscription data e.g., in case the (DNN, S-NSSAI) is not explicitly subscribed, the SMF may use local configuration instead of Session Management Subscription data.

If the Request Type received in step 3 indicates "Emergency Request":

For an authenticated non-roaming UE, based on operator configuration (e.g., related with whether the operator uses a fixed SMF for Emergency calls, etc.), the SMF may register in the UDM using Nudm_UECM_Registration (SUPI, PDU Session ID, Indication of Emergency Services) for a given PDU Session that is applicable for emergency services. As a result, the UDM shall store the SMF address and the applicable PDU Session for Emergency services.

For an unauthenticated UE or a roaming UE, the SMF shall not register in the UDM for a given PDU Session.

If the Request Type in step 3 indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the Request Type is "Initial request" and if the Old PDU Session ID is included in Nsmf_PDUSession_CreateSMContext Request, the SMF identifies the existing PDU Session to be released based on the Old PDU Session ID.

Subscription data includes the Allowed PDU Session Type(s), Allowed SSC mode(s), default 5QI and ARP, subscribed Session-AMBR. Static IP address/prefix may be included in the subscription data if the UE has subscribed to it.

The SMF checks the validity of the UE request including:
whether the UE request is compliant with the user subscription and with local policies; and
if the DNN corresponds to an LADN, whether the UE is located within the LADN service area based on the "UE presence in LADN service area" indication from the AMF. If the AMF does not provide the "UE presence in LADN service area" indication and the SMF determines that the DNN corresponds to a LADN, then the SMF considers that the UE is OUT of the LADN service area.

If the UE request is considered as not valid, the SMF decides to not accept to establish the PDU Session.

In operation 5, the SMF responds to the message received in operation 3 by Nsmf_PDUSession_CreateSMContextResponse or Nsmf_PDUSession_UpdateSMContextResponse, as appropriate. If the SMF received Nsmf_PDUSession_CreateSMContextRequest in operation 3 and the SMF is able to process the PDU Session establishment request, the SMF creates an SM context and responds to the AMF by providing an SM Context Identifier.

In case the user plane (UP) Security Policy for the PDU Session is determined to have Integrity Protection set to "Required", the SMF may, based on local configuration, decide whether to accept or reject the PDU Session request based on the UE Integrity Protection Maximum Data Rate. Note that the SMF can be configured to reject a PDU Session if the UE Integrity Protection Maximum Data Rate has a very low value, in case the services provided by the DN would require higher bitrates.

When the SMF decides to not accept to establish a PDU Session, the SMF rejects the UE request via NAS SM signaling including a relevant SM rejection cause by responding to the AMF with Nsmf_PDUSession_CreateSMContext Response. The SMF also indicates to the AMF that the PDU Session ID is to be considered as released, the SMF proceeds to step 20 and the PDU Session Establishment procedure is stopped.

Operation 6 involves an optional Secondary authorization/authentication. If the Request Type in step 3 indicates "Existing PDU Session", the SMF does not perform secondary authorization/authentication. If the Request Type received in step 3 indicates "Emergency Request" or "Existing Emergency PDU Session", the SMF shall not perform secondary authorization/authentication. If the SMF needs to perform secondary authorization/authentication during the establishment of the PDU Session by a DN-AAA server as described in 3GPP TS 23.501 clause 5.6.6, the SMF triggers the PDU Session establishment authentication/authorization as described in clause 4.3.2.3.

In operation 7a, if dynamic PCC is deployed and a PCF ID is provided by the AMF, the SMF performs PCF selection as described in 3GPP TS 23.501 clause 6.3.7.1. If the Request Type indicates "Existing PDU Session" or "Existing Emergency PDU Session", the SMF shall use the PCF already selected for the PDU Session. If dynamic PCC is not deployed, the SMF may apply local policy.

In operation 7b, the SMF may perform an SM Policy Association Establishment procedure as defined in clause 4.16.4 to establish a PDU Session with the PCF and get the default PCC Rules for the PDU Session. GPSI shall be included if available at SMF. If the Request Type in operation 3 indicates "Existing PDU Session", the SMF may provide information on the Policy Control Request Trigger condition(s) that have been met by an SMF initiated SM Policy Association Modification procedure as defined in clause 4.16.5.1. The PCF may provide policy information defined in clause 5.2.5.4 (and in 3GPP TS 23.503) to SMF. The PCF, based on the Emergency DNN, sets the ARP of the PCC rules to a value that is reserved for Emergency services as described in 3GPP TS 23.503.

In general, the purpose of operations 7a-7b is to receive PCC rules before selecting UPF. If PCC rules are not needed as input for UPF selection, operations 7a-7b can be performed after operation 8.

In operation 8, if the Request Type in operation 3 indicates "Initial request", the SMF selects an SSC mode for the PDU Session as described in 3GPP TS 23.501 clause 5.6.9.3. The SMF also selects one or more UPFs as needed as described in clause 6.3.3. In case of PDU Session Type IPv4 or IPv6 or IPv4v6, the SMF allocates an IP address/prefix for the PDU Session as described in clause 5.8.1. In case of PDU Session Type IPv6 or IPv4v6, the SMF also allocates an interface identifier to the UE for the UE to build its link-local address. For Unstructured PDU Session Type the SMF may allocate an IPv6 prefix for the PDU Session and N6 point-to-point tunneling (based on UDP/IPv6) as described in clause 5.6.10.3. For Ethernet PDU Session Type, neither a MAC nor an IP address is allocated by the SMF to the UE for this PDU Session.

If the Request Type in operation 3 is "Existing PDU Session", the SMF maintains the same IP address/prefix that has already been allocated to the UE in the source network. If the Request Type in operation 3 indicates "Existing PDU Session" refers to an existing PDU Session moved between 3GPP access and non-3GPP access, the SMF maintains the SSC mode of the PDU Session, the current PDU Session Anchor and IP address. If the Request Type in operation 3 indicates "Emergency Request", the SMF selects the UPF as described in clause 5.16.4 and selects SSC mode 1.

In operation 9, the SMF may perform an SMF initiated SM Policy Association Modification procedure as defined in 3GPP TS 23.501 clause 4.16.5.1 to provide information on the Policy Control Request Trigger condition(s) that have been met. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es). When PCF is deployed, the SMF shall further report the PS Data Off status to PCF if the PS Data Off Policy Control Request Trigger is provisioned, the additional behavior of SMF and PCF for 3GPP PS Data Off is defined in 3GPP TS 23.503.

Note that if an IP address/prefix has been allocated before operation 7 (e.g., subscribed static IP address/prefix in UDM/UDR) or if operation 7 is perform after operation 8 as discussed above, the IP address/prefix can be provided to PCF in operation 7, and the IP address/prefix notification in this operation 9 can be skipped.

In addition, in operation 9, the PCF may provide updated policies (e.g., policy information) to the SMF, such as defined in 23.501 clause 5.2.5.4 and in 3GPP TS 23.503. As such, in various exemplary embodiments, the PCF can also provide the new information element(s) (IE) safe-guard-disable and/or safe-guard-enable within the existing messages comprising operation 9, or in a new message added to operation 9.

In operation 10, if Request Type indicated "initial request", the SMF initiates an N4 Session Establishment procedure with the selected UPF, otherwise it initiates an N4 Session Modification procedure with the selected UPF. If multiple UPFs are selected for the PDU Session, the SMF initiates N4 Session Establishment/Modification procedure with each UPF of the PDU Session. If the Request Type indicates "Existing PDU Session", and the SMF creates CN Tunnel Info, then this step is skipped. Otherwise, this step is performed to obtain the CN Tunnel Info from the UPF using the N4 Session Modification Procedure.

This involves, in operation 10a, the SMF sending to UPF an N4 Session Establishment/Modification Request and providing packet detection, enforcement, and reporting rules to be installed on the UPF for this PDU Session. If CN Tunnel Info is allocated by the SMF, the CN Tunnel Info is provided to UPF in this operation. If the selective User Plane deactivation is required for this PDU Session, the SMF determine the Inactivity Timer and it provides to the UPF.

Operation 10 also includes sub-operation 10b, in which the UPF acknowledges by sending an N4 Session Establishment/Modification Response. If CN Tunnel Info is allocated by the UPF, the CN Tunnel Info is provided to SMF in this operation.

In operation 11, the SMF sends a Namf_Communication_N1N2MessageTransfer message to the AMF. This message includes various IEs such as PDU Session ID, N2 SM information, and an N1 SM container for a PDU Session Establishment Accept message. More specifically, the PDU Session ID allows the AMF to know which access to use towards the UE, and the N2 SM information includes information that the AMF shall forward to the (R)AN such as:

- The CN Tunnel Info corresponds to the Core Network address of the N3 tunnel corresponding to the PDU Session.
- One or multiple QoS profiles and the corresponding QFIs can be provided to the (R)AN. This is further described in TS 23.501 [2] clause 5.7.
- The PDU Session ID may be used by AN signaling with the UE to indicate to the UE the association between (R)AN resources and a PDU Session for the UE.
- A PDU Session is associated to an S-NSSAI and a DNN. The S-NSSAI provided to the (R)AN, is the S-NSSAI with the value for the serving PLMN.
- User Plane Security Enforcement information is determined by the SMF as described in 23.501 clause 5.10.3.

If the User Plane Security Enforcement information indicates that Integrity Protection is "Preferred" or "Required", the SMF also includes the UE Integrity Protection Maximum Data Rate as received in the SGSM Capability.

The N1 SM container contains the PDU Session Establishment Accept that the AMF shall provide to the UE. If the UE requested P-CSCF discovery, then the message shall also include the P-CSCF IP address(es) as determined by the SMF. The PDU Session Establishment Accept includes S-NSSAI from the Allowed NSSAI. For roaming scenario, the PDU Session Establishment Accept also includes corresponding S-NSSAI from the Mapping Of Allowed NSSAI that SMF received in operation 3. Multiple QoS Rules, QoS Flow level QoS parameters if needed for the QoS Flow(s) associated with those QoS rule(s) and QoS Profiles may be included in the PDU Session Establishment Accept and within the N2 SM information.

In various embodiments, the SMF can also provide the AMF with the new information element(s) (IE) safe-guard-time_disable and/or safe-guard-time_enable within the Namf_Communication_N1N2MessageTransfer message comprising operation 11, such as within an existing IE and/or container or within a new IE and/or container. Additionally, a new message can be added to operation 11 to carry these new IEs.

In operation 12, the AMF sends to the (R)AN a N2 PDU Session Request message that includes: 1) the N2 SM information received in operation 11; and 2) a NAS message containing PDU Session ID and PDU Session Establishment Accept message received in the N1 SM container in operation 11. In various embodiments, the AMF can also provide the (R)AN with the new information element(s) (IE) safe-guard-time_disable and/or safe-guard-time enable within the N2 PDU Session Request message, such as within an existing IE and/or container or within a new IE and/or container. Alternately, a new message can be added to operation 12 to carry these new IEs.

In operation 13, the (R)AN may utilize access network (AN)-specific signaling exchange with the UE related to the information received from SMF (via the AMF, e.g., in operations 11-12). For example, in case of a NG-RAN, an RRC Connection Reconfiguration may take place with the UE establishing the necessary NG-RAN resources related to the QoS Rules for the PDU Session request received in operation 12. The (R)AN can also allocate N3 Tunnel Info for the PDU Session.

In case of Dual Connectivity (DC), the RAN may assign some (i.e., zero or more) QoS flow identities (QFIs) to be setup to a Master RAN node and others to the Secondary RAN node. The AN Tunnel Info includes a tunnel endpoint for each involved (R)AN node, and the QFIs assigned to each tunnel endpoint. A QFI can be assigned to either the Master RAN node or the Secondary RAN node and not to both.

The (R)AN forwards the NAS message (PDU Session ID, N1 SM container (PDU Session Establishment Accept)) provided in step 12 to the UE. (R)AN shall only provide the NAS message to the UE if the necessary (R)AN resources are established and the allocation of (R)AN Tunnel Info are successful. If MICO mode is active and the NAS message Request Type in step 1 indicated "Emergency Request", then the UE and the AMF shall locally deactivate MICO mode.

In operation 14, the (R)AN responds to the message received from AMF in operation 12. For example, the (R)AN sends an N2 PDU Session Response message including PDU Session ID, Cause, and N2 SM information (which includes PDU Session ID, AN Tunnel Info, List of accepted/rejected QFI(s), User Plane Enforcement Policy Notification).

The AN Tunnel Info corresponds to the Access Network address of the N3 tunnel corresponding to the PDU Session. If the (R)AN rejects QFI(s), the SMF is responsible of updating the QoS rules and QoS Flow level QoS parameters if needed for the QoS Flow associated with the QoS rule(s) in the UE accordingly. The NG-RAN rejects the establishment of UP resources for the PDU Session when it cannot fulfil User Plane (UP) Security Enforcement indicating a value of Required. In this case the SMF releases the PDU session. The NG-RAN notifies the SMF when it cannot fulfil UP Security Enforcement indicating a value of Preferred.

In operation 15, the AMF sends a Nsmf_PDUSession_UpdateSMContextRequest message, to the SMF, that includes a Request Type and the forwarded N2 SM information received in operation 14. If the list of rejected QFI(s) is included in N2 SM information, the SMF shall release the rejected QFI(s) associated QoS profiles. If the UP Enforcement Policy Notification in N2 SM information indicates that no user plane resources could be established, and the UP Enforcement Policy indicated "required" as described in 23.501 clause 5.10.3, the SMF shall release the PDU session.

In operation 16*a*, the SMF initiates an N4 Session Modification procedure with the UPF. In the N4 Session Modification Request message, the SMF provides AN Tunnel Info to the UPF as well as the corresponding forwarding rules. If the PDU Session Establishment Request was due to mobility between 3GPP and non-3GPP access or mobility from EPC, the downlink data path is switched towards the target access during this operation.

In operation 16*b*, the UPF provides an N4 Session Modification Response to the SMF. If multiple UPFs are used in the PDU Session, the UPF in step 16 refers to the UPF terminating N3. After this operation, the UPF can deliver any down-link packets to the UE that may have been buffered for this PDU Session.

In operation 17, the SMF sends to the AMF a Nsmf_PDUSession_UpdateSMContextResponse message with a Cause indication. The SMF may subscribe to the UE mobility event notification from the AMF (e.g., location reporting, UE moving into or out of Area of Interest, etc.) after this operation by invoking a Namf_EventExposure_Subscribe service operation as specified in 23.501 clause 5.2.2.3.2. For LADN, the SMF subscribes to the UE moving into or out of LADN service area event notification by providing the LADN DNN as an indicator for the Area of Interest (see 23.501 clauses 5.6.5 and 5.6.11). After this operation, the AMF can forward relevant events subscribed to by the SMF.

In operation 18 (conditional), the SMF sends to the AMF a Nsmf_PDUSession_UpdateSMContextStatusNotify message with a Release indication if the PDU Session establishment failed any time during the procedure after operation 5. The SMF also releases any N4 session(s) created, any PDU Session address (e.g., IP address) allocated, and any association with PCF.

In operation 19, in case of PDU Session Type IPv6 or IPv4v6, the SMF generates an IPv6 Router Advertisement and sends it to the UE via N4 and the UPF.

In operation 20 (conditional), if the PDU Session establishment failed any time during the procedure after operation 4, the SMF shall unsubscribe to the modifications of Session Management Subscription data for the corresponding (SUPI, DNN, S-NSSAI) by sending the message Nudm_SDM_Unsubscribe (SUPI, Session Management Subscription data, DNN, S-NSSAI), so long as the SMF is no longer handling a PDU Session of the UE for this (DNN, S-NSSAI). The UDM may unsubscribe to the modification notification from UDR by sending the message Nudr_DM_Unsubscribe (SUPI, Subscription Data, Session Management Subscription data, S-NSSAI, DNN).

In addition, under the same condition, the SMF also deregisters for the given PDU Session by sending the message Nudm_UECM_Deregistration (SUPI, DNN, PDU Session ID). The UDM may update corresponding UE context by sending the message Nudr_DM_Update (SUPI, Subscription Data, UE context in SMF data).

Figure 6:
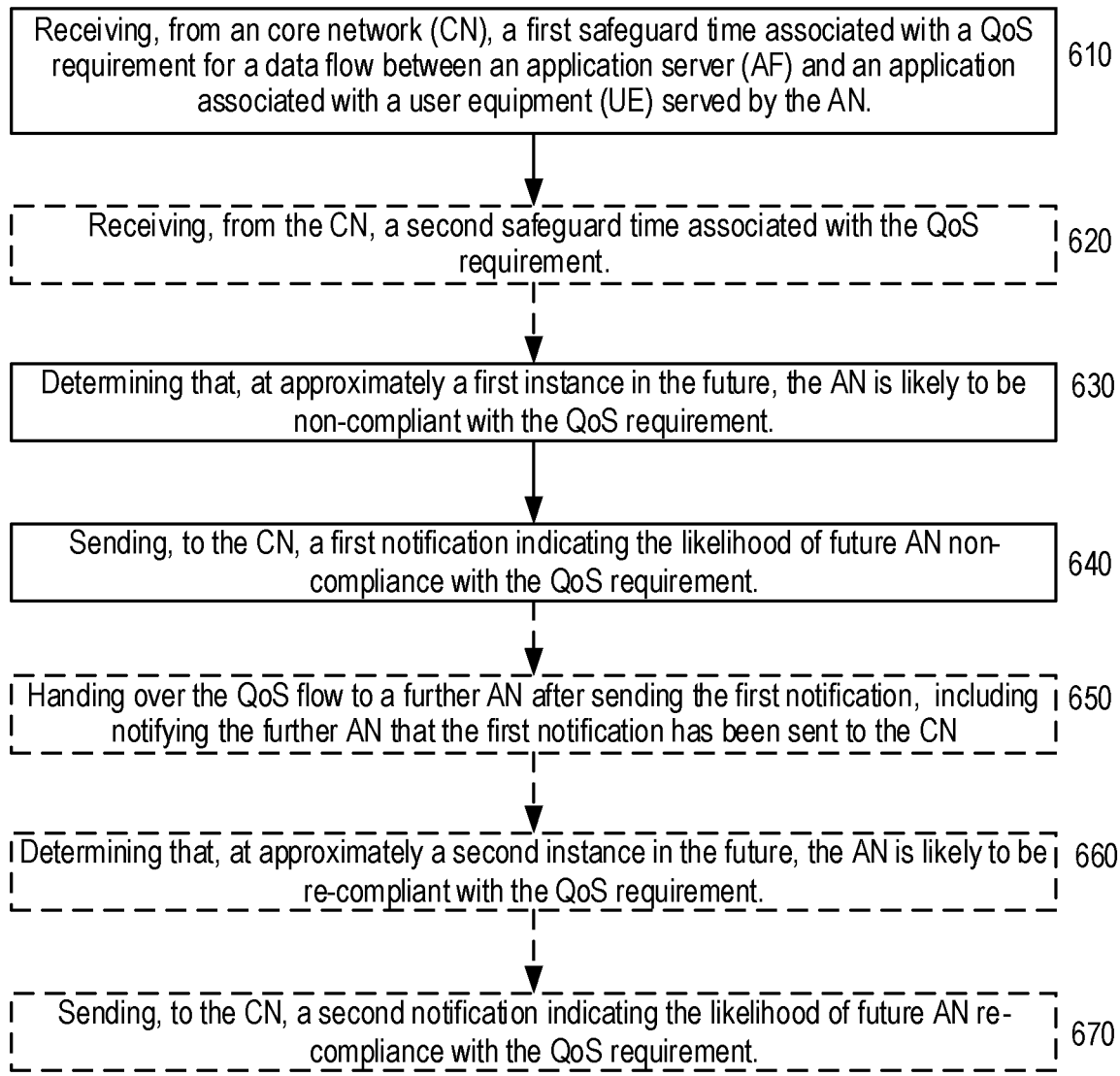
FIG. 6 is a flow diagram illustrating a method and/or procedure performed by an access network (AN, e.g., E-UTRAN, NG-RAN, or component(s) thereof), according to various exemplary embodiments of the present disclosure.

FIG. 6 is a flow diagram illustrating an exemplary method and/or procedure for notifying a user equipment (UE) of changes to an access network's (AN) compliance with a quality-of-service (QoS) guarantee for a data flow between the UE and an application server, according to various exemplary embodiments of the present disclosure. The exemplary method and/or procedure shown in FIG. 6 can be implemented, for example, by a network node (e.g., base station, eNB, gNB, etc. or component thereof) in an access network (e.g., NG-RAN). Furthermore, the exemplary method and/or procedure shown in FIG. 6 can be utilized cooperatively with other exemplary methods and/or procedures described herein (e.g., FIGS. 7 and/or 8) to provide various exemplary benefits described herein. Although FIG. 6 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 6 can include the operations of block 610, in which the access network can receive, from the CN, a first safeguard time associated with the QoS requirement for the data flow. The first safeguard time (e.g., safe-guard-time_disable) can represent an amount of time required by an application server (AF), prior to AN non-compliance with the QoS requirement, to adapt the application for safe operation during the AN non-compliance. In some embodiments, the QoS requirement for the data flow can include one or more of the following: a guaranteed minimum bit rate, a guaranteed maximum packet delay, and a guaranteed maximum packet error rate. In some embodiments, the operations of block 610 can include receiving the QoS requirement from the CN, wherein the QoS requirement implicitly indicates the first safeguard time.

In some embodiments, the exemplary method and/or procedure can also include the operations of block 620, in which the access network can receive, from the CN, a second safeguard time associated with the QoS requirement for the data flow. The second safeguard time (e.g., safe-guard-time_enable) can represent an amount of time by an application server (AF), prior to AN re-compliance with the QoS requirement after non-compliance, to adapt the application for safe operation after the AN re-compliance. In some embodiments, the operations of block 620 can include receiving the QoS requirement from the CN, wherein the QoS requirement implicitly indicates the second safeguard time. For example, the QoS requirement can implicitly indicate both the first and the second safeguard times.

The exemplary method and/or procedure can also include the operations of block 630, in which the access network can determine that, at approximately a first instance in the future, it is likely to be non-compliant with the QoS requirement. The exemplary method and/or procedure can also include the operations of block 640, in which the access network can send, to the CN, a first notification indicating a likelihood of future AN non-compliance with the QoS requirement. The first notification can be sent at least the first safeguard time before the first instance.

In some embodiments, the exemplary method and/or procedure can also include the operations of block 650, in which the access network can hand over the QoS flow to a further AN after sending the first notification. This can include, for example, notifying the further AN that the first notification has been sent to the CN.

In some embodiments, the exemplary method and/or procedure can also include the operations of block 660, in which the access network can determine that, at approximately a second instance in the future, it is likely to be re-compliant with the QoS requirement. The exemplary method and/or procedure can also include the operations of block 670, in which the access network can send, to the CN, a second notification indicating a likelihood of future AN re-compliance with the QoS requirement after non-compliance. The second notification can be sent at least the second safeguard time before the second instance.

Figure 7:
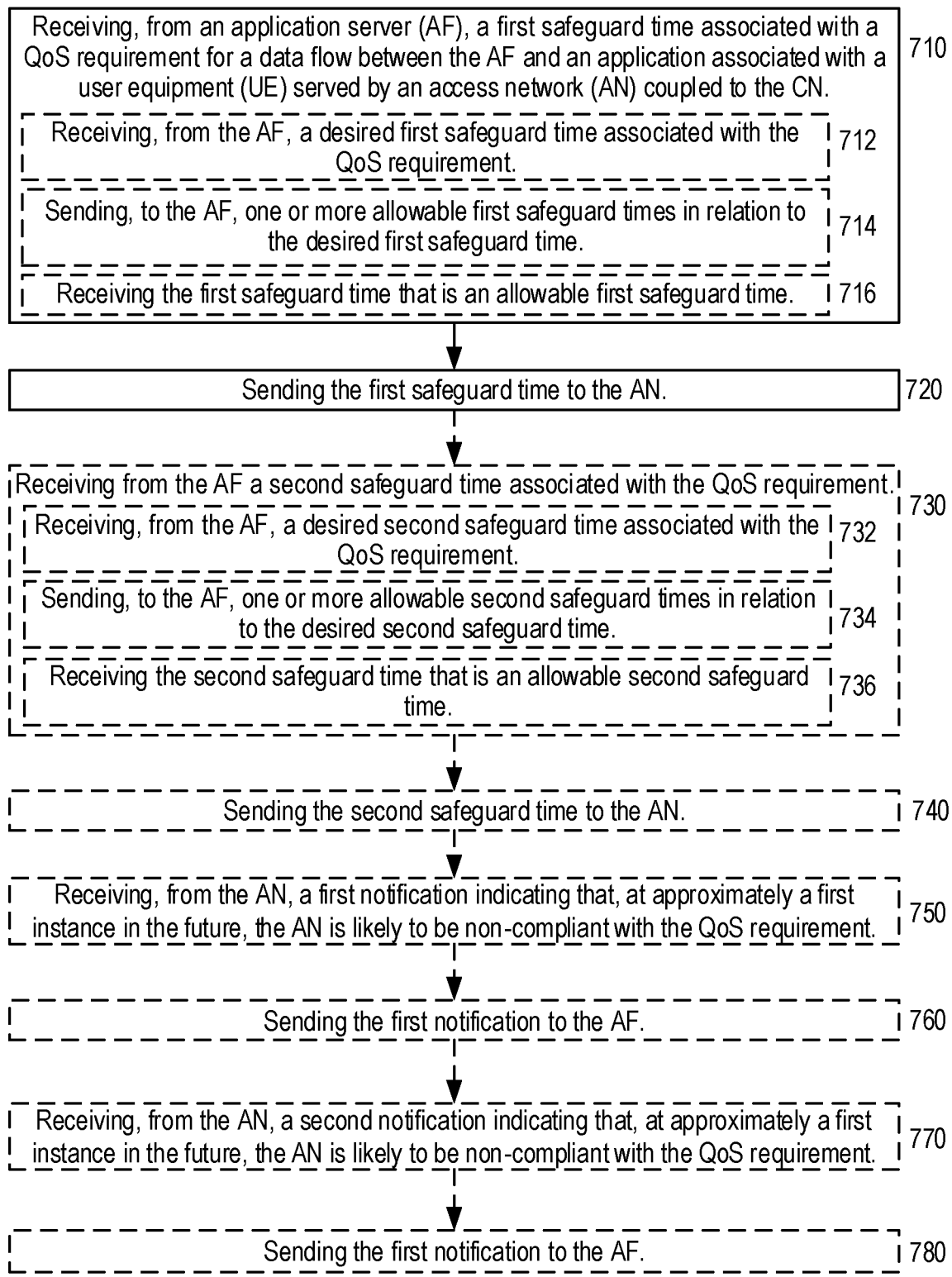
FIG. 7 is a flow diagram illustrating a method and/or procedure performed by a core network (CN, e.g., EPC, 5GC, or component(s) thereof), according to various exemplary embodiments of the present disclosure.

FIG. 7 is a flow diagram illustrating an exemplary method and/or procedure for monitoring access network (AN) compliance with a quality-of-service (QoS) requirement for a data flow between an application server (AF) and an application associated with a user equipment (UE) served by the AN, according to various exemplary embodiments of the present disclosure. The exemplary method and/or procedure shown in FIG. 7 can be implemented, for example, by a core network (CN, e.g., 5GC or component(s) thereof) coupled to the AN (e.g., NG-RAN). Furthermore, the exemplary method and/or procedure shown in FIG. 7 can be utilized cooperatively with other exemplary methods and/or procedures described herein (e.g., FIGS. 6 and/or 8) to provide various exemplary benefits described herein. Although FIG. 7 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 7 can include the operations of block 710, in which the core network can receive, from the AF, a first safeguard time associated with the QoS requirement for the data flow. The first safeguard time (e.g., safe-guard-time_disable) can represent an amount of time required, prior to AN non-compliance with the QoS requirement, to adapt the application for safe operation during the AN non-compliance. In some embodiments, the QoS requirement for the data flow can include one or more of the following: a guaranteed minimum bit rate, a guaranteed maximum packet delay, and a guaranteed maximum packet error rate. In some embodiments, the operations of block 710 can include receiving the QoS requirement from the AF, wherein the QoS requirement implicitly indicates the first safeguard time.

In some embodiments, the operations of block 170 can include the operations of sub-block 712-716. In sub-block 712, the core network can receive, from the AF, a desired first safeguard time associated with the required QoS. In sub-block 814, the core network can send, to the AF, one or more allowable first safeguard times in relation to the desired first safeguard time. In sub-block 716, the core network can receive, from the AF, the first safeguard time, where the received first safeguard time is one of the allowable first safeguard times (e.g., sent in block 714).

The exemplary method and/or procedure can also include the operations of block 720, in which the core network can send the first safeguard time to the AN. In some embodiments, the operations of block 720 can include sending the QoS requirement to the CN, wherein the QoS requirement implicitly indicates the first safeguard time.

In some embodiments, the exemplary method and/or procedure can also include the operations of block 730, in which the core network can receive, from the AF, a second safeguard time associated with the QoS requirement for the data flow. The second safeguard time (e.g., safe-guard-time_enable) can represent an amount of time required, prior to AN re-compliance with the QoS requirement after non-compliance, to adapt the application for safe operation after the AN re-compliance. In some embodiments, the operations of block 730 can include receiving the QoS requirement from the AF, wherein the QoS requirement implicitly indicates the second safeguard time. For example, the QoS requirement can implicitly indicate both the first and the second safeguard times.

In some embodiments, the operations of block 730 can include the operations of sub-block 732-736. In sub-block 732, the core network can receive, from the AF, a desired second safeguard time associated with the required QoS. In sub-block 814, the core network can send, to the AF, one or more allowable second safeguard times in relation to the desired second safeguard time. In sub-block 736, the core network can receive, from the AF, the second safeguard time, where the received second safeguard time is one of the allowable second safeguard times (e.g., sent in block 734).

In some embodiments, the exemplary method and/or procedure can also include the operations of block 740, in which the core network can send the second safeguard time to the AN. In some embodiments, the operations of block 740 can include sending the QoS requirement to the CN, wherein the QoS requirement implicitly indicates the second safeguard time. For example, the QoS requirement can implicitly indicate both the first and the second safeguard times.

In some embodiments, the exemplary method and/or procedure can also include the operations of block 750, in which the core network can receive, from the AN, a first notification indicating that, at approximately a first instance in the future, the AN is likely to be non-compliant with the QoS requirement. In such embodiments, the exemplary method and/or procedure can also include the operations of block 760, in which the core network can send the first notification to the AF. For example, the first notification can be sent at least the first safeguard time before the first instance.

In some embodiments, the exemplary method and/or procedure can also include the operations of block 770, in which the core network can receive, from the AN, a second notification indicating that, at approximately a second instance in the future, the AN is likely to be re-compliant with the QoS requirement. In such embodiments, the exemplary method and/or procedure can also include the operations of block 780, in which the core network can send the second notification to the AF. For example, the second notification can be sent at least the second safeguard time before the second instance.

Figure 8:
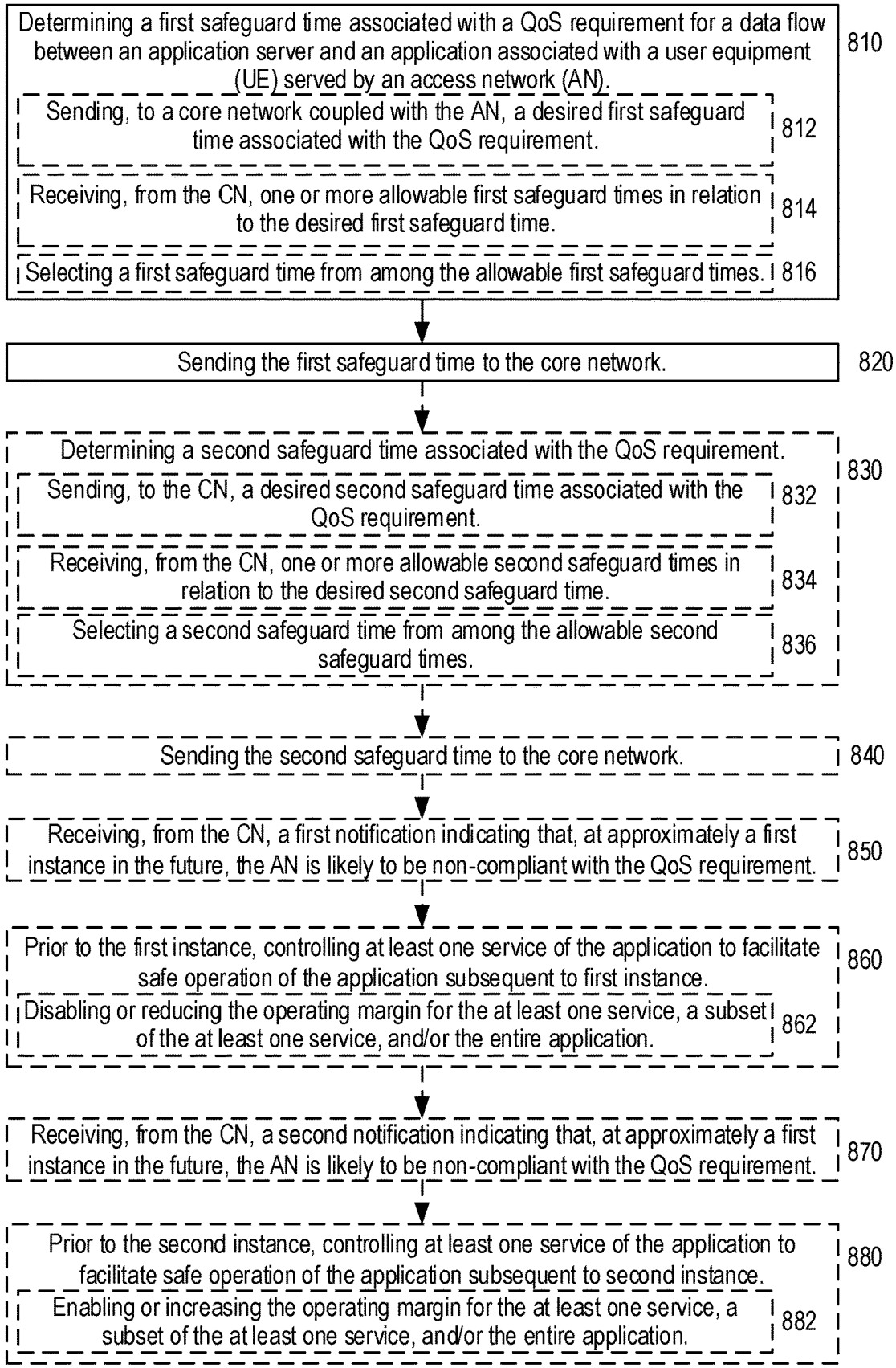
FIG. 8 is a flow diagram illustrating a method and/or procedure performed by an application server (e.g., an application function, AF) coupled to a core network and an access network, according to various exemplary embodiments of the present disclosure.

FIG. 8 is a flow diagram illustrating an exemplary method and/or procedure for monitoring access network (AN) compliance with a quality-of-service (QoS) requirement for a data flow between the application server and an application associated with a user equipment (UE) served by the AN, according to various exemplary embodiments of the present disclosure. The exemplary method and/or procedure shown in FIG. 8 can be implemented, for example, by an application server (e.g., an AF) coupled to a core network (e.g., 5GC) and an access network (e.g., NG-RAN). Furthermore, the exemplary method and/or procedure shown in FIG. 8 can be utilized cooperatively with other exemplary methods and/or procedures described herein (e.g., FIGS. 6 and/or 7) to provide various exemplary benefits described herein. Although FIG. 8 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 8 can include the operations of block 810, in which the application server can determine a first safeguard time associated with the QoS requirement for the data flow. The first safeguard time (e.g., safe-guard-time_disable) can represent an amount of time required, prior to AN non-compliance with the QoS requirement, to adapt the application for safe operation during the AN non-compliance. In some embodiments, the QoS requirement for the data flow can include one or more of the following: a guaranteed minimum bit rate, a guaranteed maximum packet delay, and a guaranteed maximum packet error rate.

The exemplary method and/or procedure can also include the operations of block 820, in which the application server can send the determined first safeguard time to a core network (CN) coupled with the AN. In some embodiments, the operations of block 820 can include sending the QoS requirement to the CN, wherein the QoS requirement implicitly indicates the first safeguard time.

In some embodiments, the operations of block 810 can include the operations of sub-block 812-816. In sub-block 812, the application server can send, to the CN, a desired first safeguard time associated with the required QoS. In sub-block 814, the application server can receive, from the CN, one or more allowable first safeguard times in relation to the desired first safeguard time. In sub-block 816, the application server can select the first safeguard time from among the allowable first safeguard times (e.g., for sending in block 820 as the determined first safeguard time).

In some embodiments, the exemplary method and/or procedure can also include the operations of block 830, in which the application server can determine a second safeguard time associated with the QoS requirement for the data flow. The second safeguard time (e.g., safe-guard-time_enable) can represent an amount of time required, prior to AN re-compliance with the QoS requirement after non-compliance, to adapt the application for safe operation during the AN re-compliance.

In such embodiments, the exemplary method and/or procedure can also include the operations of block 840, in which the application server can send the determined second safeguard time to a core network (CN) coupled with the AN. In some embodiments, the operations of block 840 can include sending the QoS requirement to the CN, wherein the QoS requirement implicitly indicates the second safeguard time.

In some embodiments, the operations of block 830 can include the operations of sub-block 832-836. In sub-block 832, the application server can send, to the CN, a desired second safeguard time associated with the required QoS. In sub-block 814, the application server can receive, from the CN, one or more allowable second safeguard times in relation to the desired second safeguard time. In sub-block 816, the application server can select the second safeguard time from among the allowable second safeguard times (e.g., for sending in block 840 as the determined second safeguard time).

In some embodiments, the exemplary method and/or procedure can also include the operations of block 850, in which the application server can receive, from the CN, a first notification indicating that, at approximately a first instance in the future, the AN is likely to be non-compliant with the QoS requirement. The first notification can be received at least the first safeguard time before the first instance.

In such embodiments, the exemplary method and/or procedure can also include the operations of block 860, in which the application server can, in response to the first notification and prior to the first instance, control (e.g., adapt) at least one service of the application to facilitate safe operation of the application subsequent to first instance. In some embodiments, the operations of block 860 can include the operations of sub-block 862, where the application server can disable or reduce the operating margin for at least one of the following: the at least one service, a subset of the at least one service, and the entire application.

In some embodiments, the exemplary method and/or procedure can also include the operations of block 870, in which the application server can receive, from the CN, a second notification indicating that, at approximately a second instance in the future, the AN is likely to be re-compliant with the QoS requirement. The second notification can be received at least the second safeguard time before the second instance.

In such embodiments, the exemplary method and/or procedure can also include the operations of block 880, in which the application server can, in response to the second notification and prior to the second instance, control (e.g., adapt) at least one service of the application to facilitate safe operation of the application subsequent to second instance. In some embodiments, the operations of block 880 can include the operations of sub-block 882, where the application server can enable or increase the operating margin for at least one of the following: the at least one service, a subset of the at least one service, and the entire application.

Figure 9:
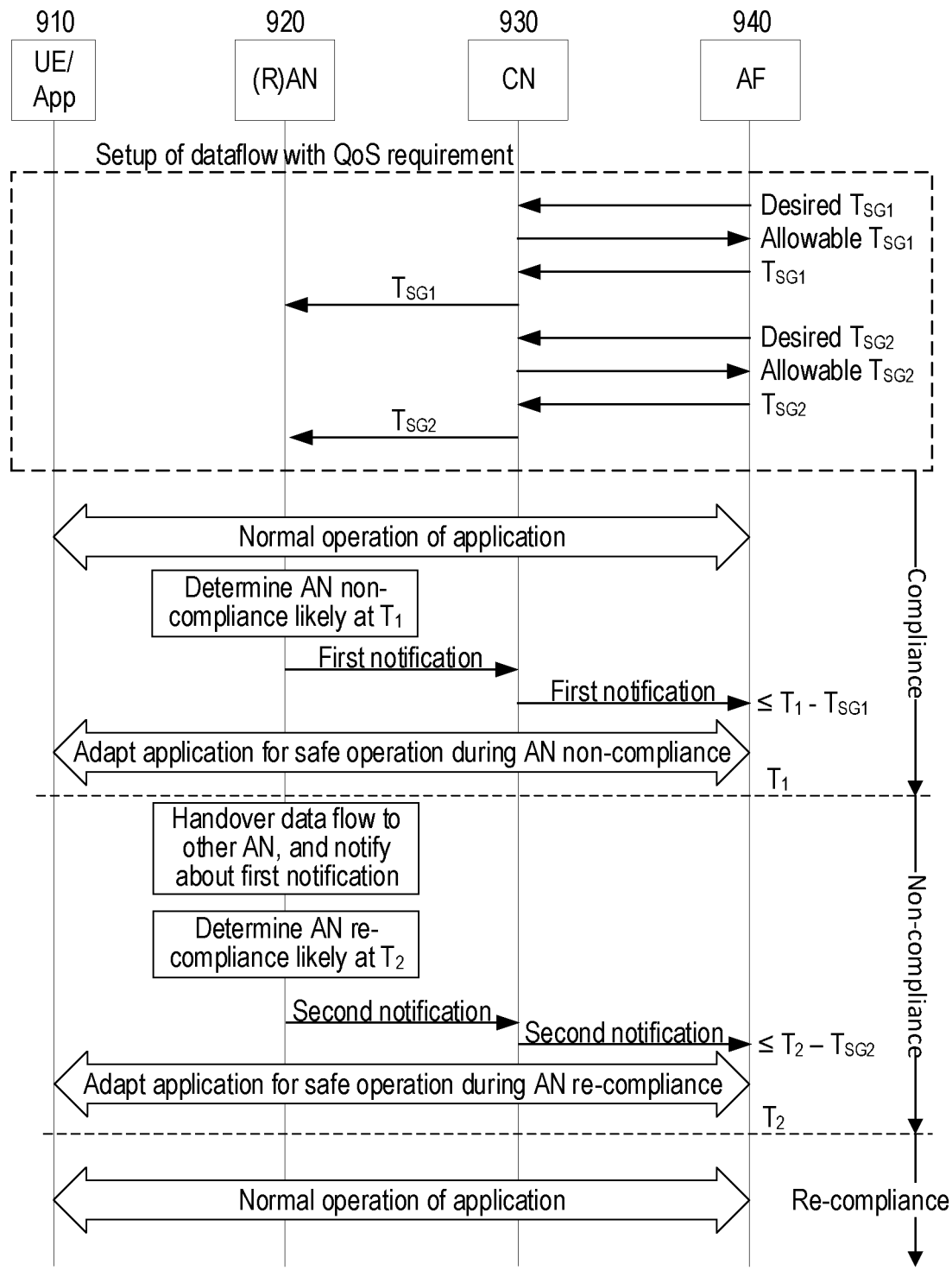
FIG. 9 is a flow diagram illustrating an alternative view of the operations shown in FIGS. 6-8, according to various exemplary embodiments of the present disclosure.

FIG. 9 is a flow diagram illustrating an alternate view of the exemplary methods and/or procedures shown in FIG. 6-8, according to various exemplary embodiments of the present disclosure. In particular, FIG. 9 shows the overall signaling flow between an application function (AF 940), core network (CN 930), access network (AN 920, e.g., RAN), and user equipment (UE 910) that corresponds to the operations of these individual elements as shown in FIGS. 6-8. Although FIG. 9 shows operations in a particular order, this order is merely exemplary and the operations of the exemplary method and/or procedure can be performed in a different order than shown, and can be combined and/or divided into operations having different functionality than shown. For the sake of clarity, FIG. 9 does not indicate optional operations, but these can be determined with reference to FIGS. 6-8.

Initially, a data flow with a QoS requirement is setup between the AF and the UE, e.g., an application on the UE that is associated with the AF. For example, this data flow can be setup in the manner illustrated in FIG. 5. As part of this setup procedure, the AF can provide the CN with IEs safe-guard-time_disable (labelled $T_{SG1}$ in FIG. 9) and/or safe-guard-time_enable (labelled $T_{SG2}$ in FIG. 9). In some embodiments, this can be done based on a negotiation between AF and CN, with AF provided CN with a desired $T_{SG1}$ (and/or $T_{SG2}$), CN responding with allowable values of $T_{SG1}$ (and/or $T_{SG2}$), and AF responding with a value of $T_{SG1}$ (and/or $T_{SG2}$) selected from the allowable values. The CN can provide the selected values to the AN.

Normal operation of the application proceeds for some period of time after the setup is complete, until the AN determines that it is likely to be non-compliant with the application's QoS requirement at some future time instance (labelled $T_1$). In response, the AN sends a first notification of the likelihood of non-compliance to the CN, which then forwards the first notification to the AF, such that the AF receives the first notification at least $T_{SG1}$ (i.e., safe-guard-time_disable) before the first instance (labelled≤$T_1$–$T_{SG1}$ in FIG. 9). In response, and prior to $T_1$, the AF controls and/or adapts the application (e.g., at least one service of the application) for safe operation during the AN non-compliance after $T_1$. This can involve disabling or decreasing the operating margin for at least one service, a subset of at least one service, or the entire application.

If the AN is in fact non-compliant with the QoS requirement after $T_1$, the AN may decide to handover the data flow to another AN coupled to the CN (e.g., from EUTRAN to NG-RAN). In such case, as part of the handover, the AN notifies the other AN that it previously sent the first notification to the AF. If handover does occur, the following FIG. 9 operations involve the other AN.

Subsequently, the AN determines that it is likely to be re-compliant with the application's QoS requirement at some future time instance (labelled $T_2$). In response, the AN sends a second notification of the likelihood of re-compliance to the CN, which then forwards the first notification to the AF, such that the AF receives the second notification at least $T_{SG2}$ (i.e., safe-guard-time_enable) before the second instance (labelled≤$T_2$–$T_{SG2}$ in FIG. 9). In response, and prior to $T_2$, the AF controls and/or adapts the application (e.g., at least one service of the application) for safe operation during the AN re-compliance after $T_2$. This can involve enabling or increasing the operating margin for at least one service, a subset of at least one service, or the entire application.

Figure 10:
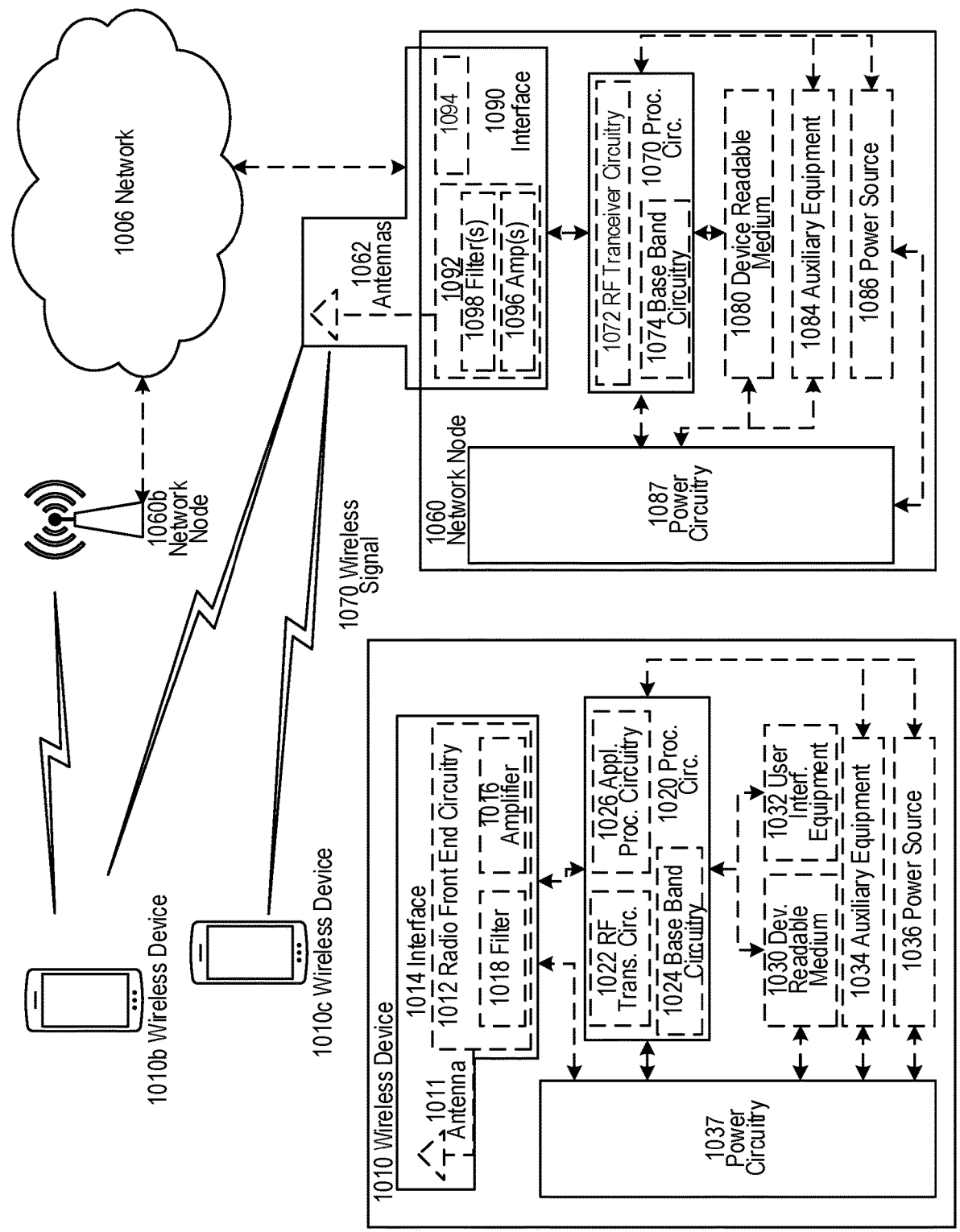
FIG. 10 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network can further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, NBs, eNBs, gNBs, or components thereof). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs, SGWs), O&M nodes, OSS nodes, SON nodes, positioning nodes (e.g., E-SMLCs), and/or MDTs. As another example, a network node can be a virtual network node as described in more detail below. As yet another example, a core network node can represent, host, and/or be associated with one or more 5GC network functions (NFs), such as UPFs, AMFs, SMFs, etc. described herein above.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and a RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 can execute instructions stored in device readable medium 1080 or in memory within processing circuitry 1070. Such functionality can include providing any of the various wireless features, functions, or benefits discussed herein. In some embodiments, processing circuitry 1070 can include a system on a chip (SOC).

In some embodiments, processing circuitry 1070 can include one or more of radio frequency (RF) transceiver circuitry 1072 and baseband processing circuitry 1074. In some embodiments, radio frequency (RF) transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060 but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some embodiments, processing circuitry 1070 and device readable medium 1080 can be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some embodiments, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some embodiments, a wireless device (WD, e.g. WD 1010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative embodiments, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some embodiments, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and can be configured to condition signals communicated between antenna 1011 and processing circuitry 1020. Radio front end circuitry 1012 can be coupled to or a part of antenna 1011. In some embodiments, WD 1010 may not include separate radio front end circuitry 1012; rather, processing circuitry 1020 can comprise radio front end circuitry and can be connected to antenna 1011. Similarly, in some embodiments, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality can include providing any of the various wireless features or benefits discussed herein. For example, processing circuitry 1020 can execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some embodiments, RF transceiver circuitry 1022 can be a part of interface 1014. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010, and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network, and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
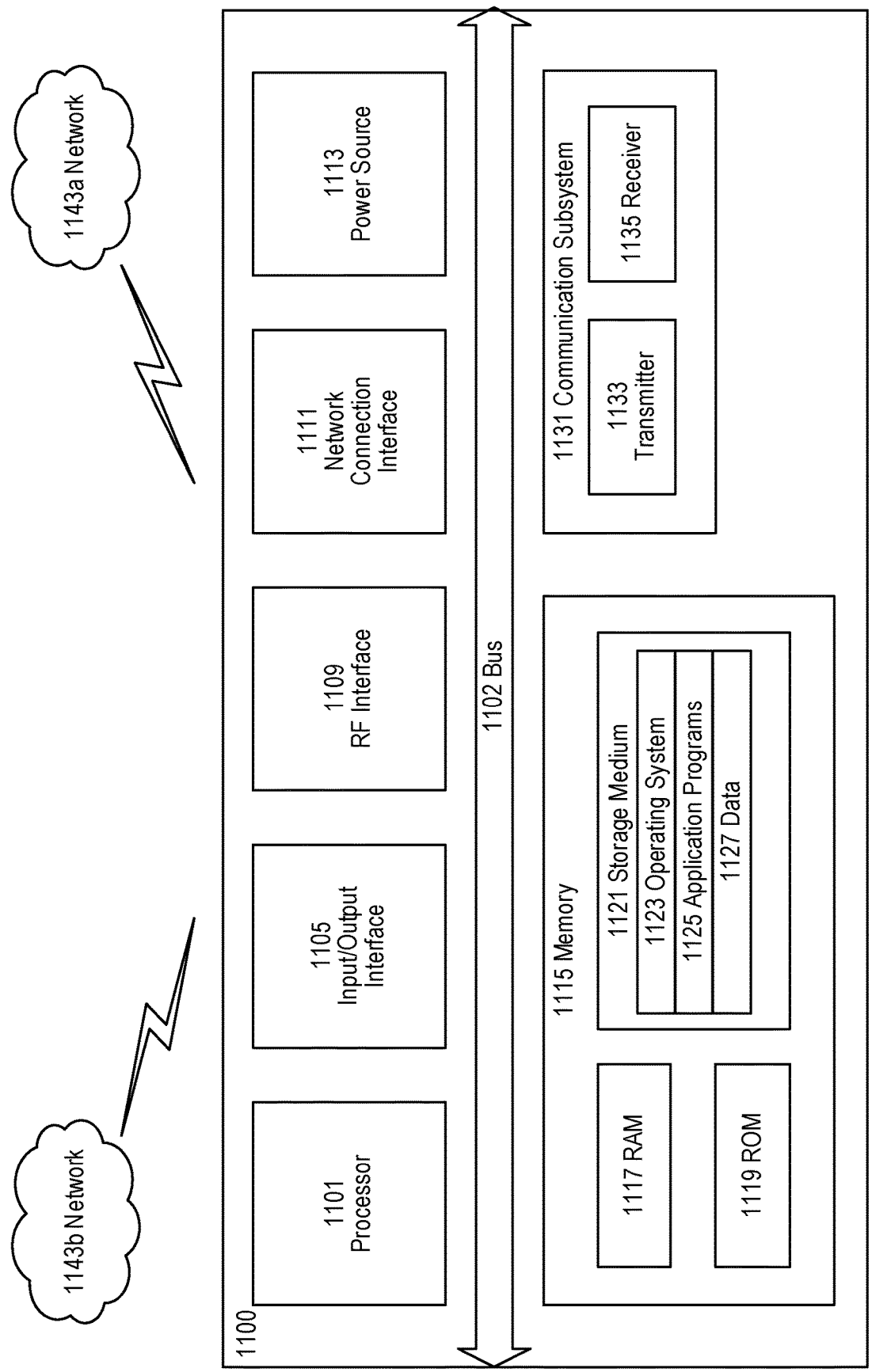
FIG. 11 illustrates an exemplary embodiment of a UE, according to various exemplary embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 11200 can be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143a. Network 1143a can encompass wired and/or wireless networks such as a local-area network (LAN), a wide-area network (WAN), a computer network, a wireless network, a telecommunications network, another like network or any combination thereof. For example, network 1143a can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 can be configured to include operating system 1123, application program 1125 such as a web browser application, a widget or gadget engine or another application, and data file 1127. Storage medium 1121 can store, for use by UE 1100, any of a variety of various operating systems or combinations of operating systems.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143b using communication subsystem 1131. Network 1143a and network 1143b can be the same network or networks or different network or networks. Communication subsystem 1131 can be configured to include one or more transceivers used to communicate with network 1143b. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143b can encompass wired and/or wireless networks such as a local-area network (LAN), a wide-area network (WAN), a computer network, a wireless network, a telecommunications network, another like network or any combination thereof. For example, network 1143b can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem ix) 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
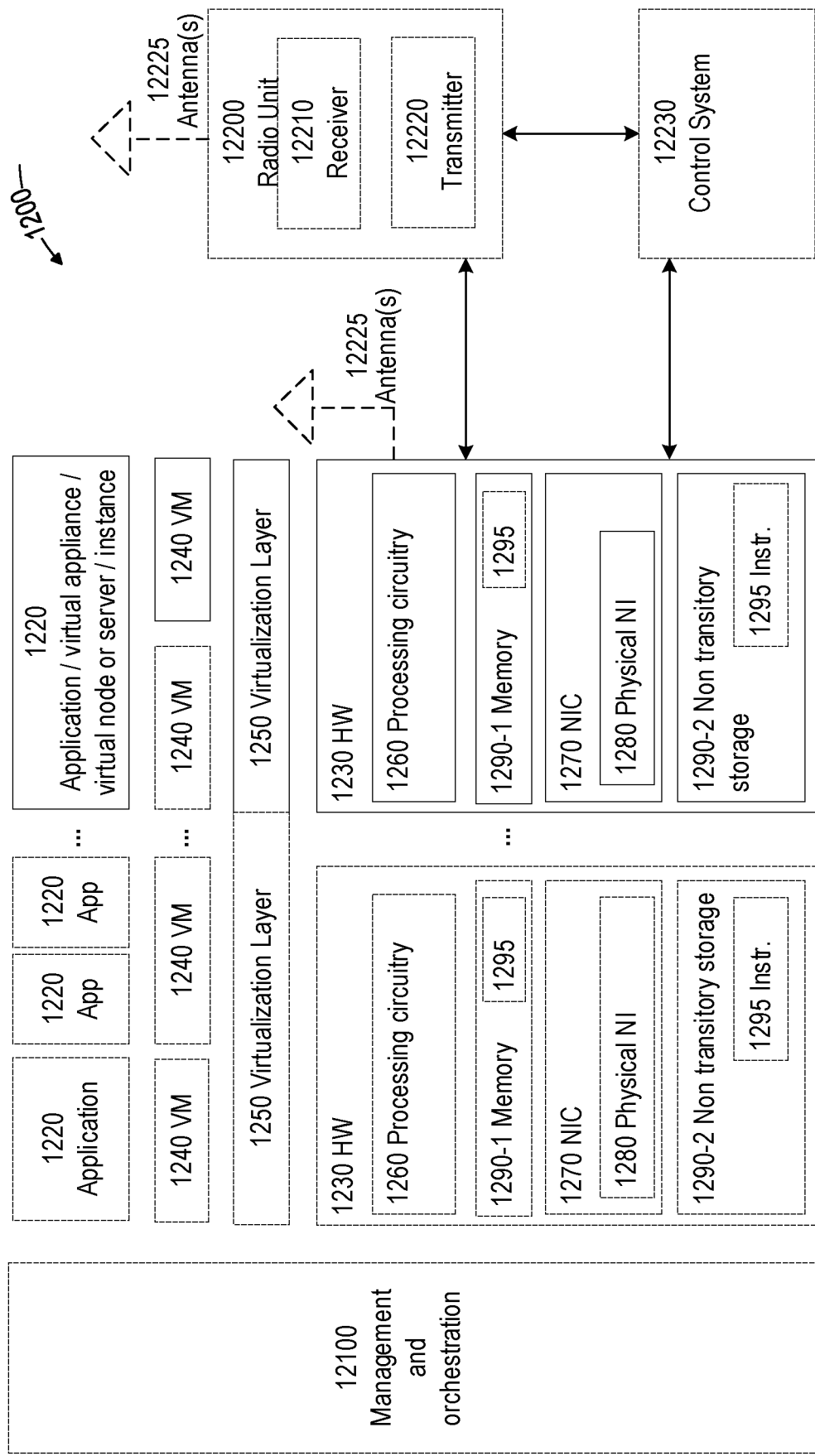
FIG. 12 is a block diagram illustrating an exemplary virtualization environment usable for implementation of various embodiments of network nodes described herein.

FIG. 12 is a schematic block diagram illustrating a virtualization environment 1200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, application functions, application servers, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station.

In some embodiments, some signaling can be effected by control system 12230 which can alternatively be used for communication between the hardware nodes 1230 and radio units 12200.

Figure 13:
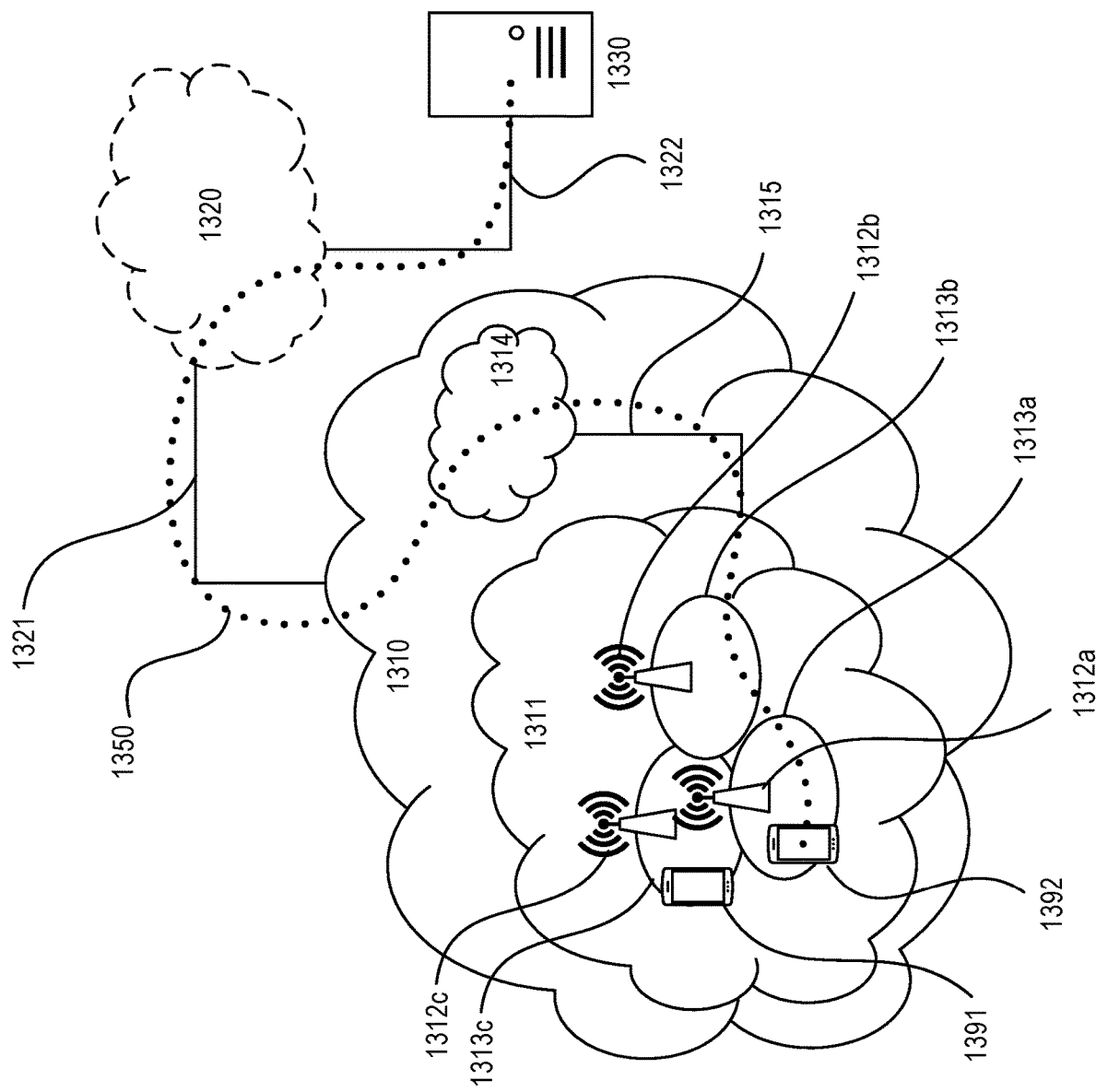
FIGS. 13-14 are block diagrams of various exemplary communication systems and/or networks, according to various exemplary embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs, or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c can be configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the Telecommunication network 1310 is itself connected to host computer 1330, which can be embodied in the hardware and/or software of a standalone server, a cloud-implemented server, a distributed server or as processing resources in a server farm. Host computer 1330 can be under the ownership or control of a service provider, or can be operated by the service provider or on behalf of the service provider. Connections 1321 and 1322 between telecommunication network 1310 and host computer 1330 can extend directly from core network 1314 to host computer 1330 or can go via an optional intermediate network 1320. Intermediate network 1320 can be one of, or a combination of more than one of, a public, private or hosted network; intermediate network 1320, if any, can be a backbone network or the Internet; in particular, intermediate network 1320 can comprise two or more sub-networks (not shown).

The communication system of FIG. 13 as a whole enables connectivity between the connected UEs 1391, 1392 and host computer 1330. The connectivity can be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 can be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which can have storage and/or processing capabilities. In particular, processing circuitry 1418 can comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 can be operable to provide a service to a remote user, such as UE 1430 connecting via OTT connection 1450 terminating at UE 1430 and host computer 1410. In providing the service to the remote user, host application 1412 can provide user data which is transmitted using OTT connection 1450.

Communication system 1400 can also include base station 1420 provided in a telecommunication system and comprising hardware 1425 enabling it to communicate with host computer 1410 and with UE 1430. Hardware 1425 can include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 can be configured to facilitate connection 1460 to host computer 1410. Connection 1460 can be direct, or it can pass through a core network (not shown in FIG. 14) of the telecommunication system and/or through one or more intermediate networks outside the telecommunication system. In the embodiment shown, hardware 1425 of base station 1420 can also include processing circuitry 1428, which can comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 can also include UE 1430 already referred to. The UE hardware 1435 can include radio interface 1437 configured to set up and maintain wireless connection 1470 with a base station serving a coverage area in which UE 1430 is currently located. Hardware 1435 of UE 1430 can also include processing circuitry 1438, which can comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 can be operable to provide a service to a human or non-human user via UE 1430, with the support of host computer 1410. In host computer 1410, an executing host application 1412 can communicate with the executing client application 1432 via OTT connection 1450 terminating at UE 1430 and host computer 1410. In providing the service to the user, client application 1432 can receive request data from host application 1412 and provide user data in response to the request data. OTT connection 1450 can transfer both the request data and the user data. Client application 1432 can interact with the user to generate the user data that it provides.

Figure 14:
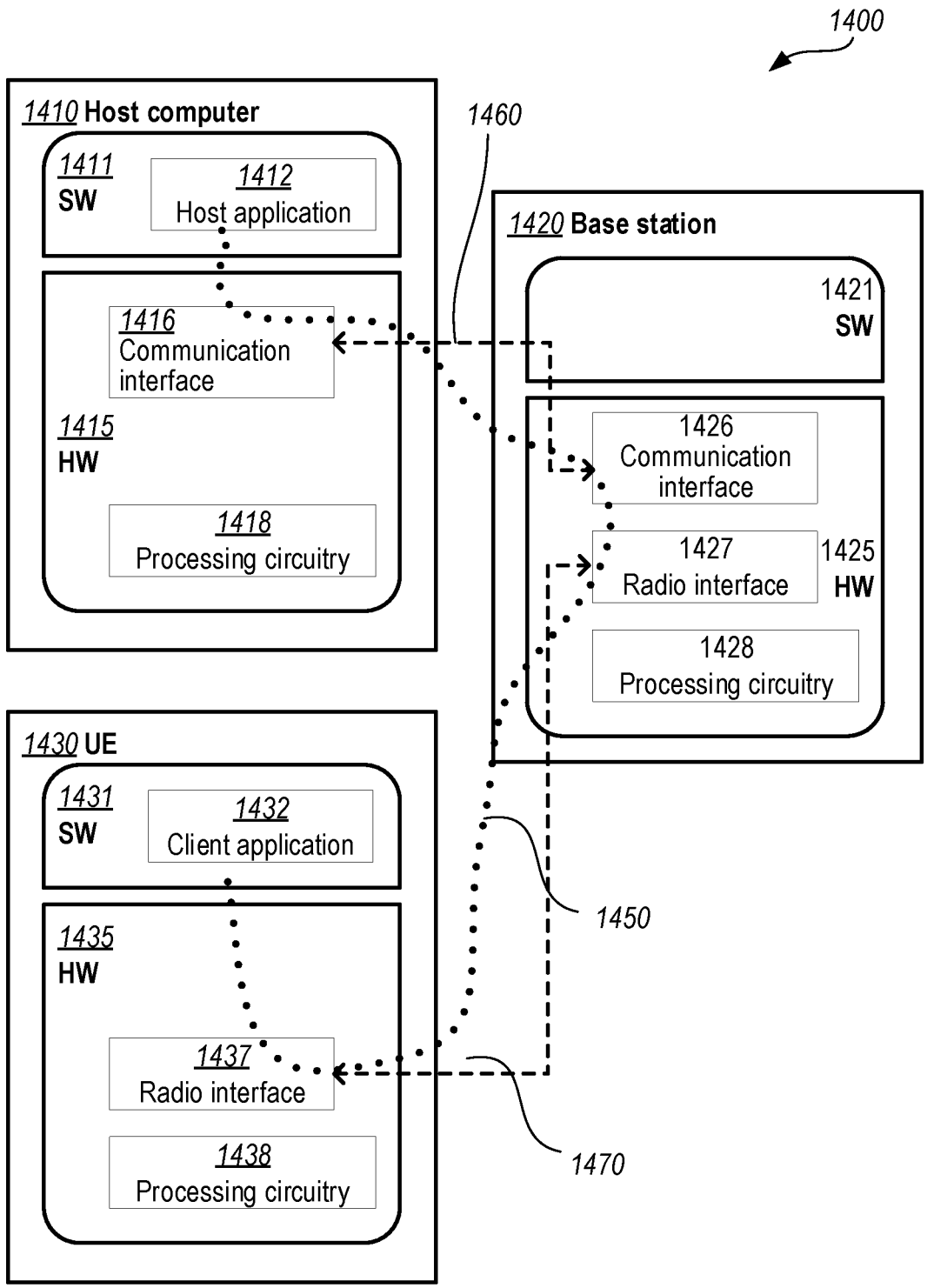

It is noted that host computer 1410, base station 1420 and UE 1430 illustrated in FIG. 14 can be similar or identical to host computer 1330, one of base stations 1312*a*, 1312*b*, 1312*c* and one of UEs 1391, 1392 of FIG. 13, respectively. This is to say, the inner workings of these entities can be as shown in FIG. 14 and independently, the surrounding network topology can be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure can determine the routing, which it can be configured to hide from UE 1430 or from the service provider operating host computer 1410, or both. While OTT connection 1450 is active, the network infrastructure can further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1450 between host computer 1410 and UE 1430, in response to variations in the measurement results. The measurement procedure and/or the network functionality for reconfiguring OTT connection 1450 can be implemented in software 1411 and hardware 1415 of host computer 1410 or in software 1431 and hardware 1435 of UE 1430, or both. In embodiments, sensors (not shown) can be deployed in or in association with communication devices through which OTT connection 1450 passes; the sensors can participate in the measurement procedure by supplying values of the monitored quantities exemplified above, or supplying values of other physical quantities from which software 1411, 1431 can compute or estimate the monitored quantities. The reconfiguring of OTT connection 1450 can include message format, retransmission settings, preferred routing etc.; the reconfiguring need not affect base station 1420, and it can be unknown or imperceptible to base station 1420. Such procedures and functionalities can be known and practiced in the art. In certain embodiments, measurements can involve proprietary UE signaling facilitating host computer 1410's measurements of throughput, propagation times, latency and the like. The measurements can be implemented in that software 1411 and 1431 causes messages to be transmitted, in particular empty or 'dummy' messages, using OTT connection 1450 while it monitors propagation times, errors etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to FIGS. 13 and 14. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to FIGS. 13 and 14. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for notifying a user equipment (UE) of changes to an access network's (AN) compliance with a quality-of-service (QoS) guarantee for a data flow between the UE and an application server, the method comprising:

receiving, from a core network coupled to the AN, a QoS required by an application associated with the UE and a first safeguard time associated with the required QoS;

establishing a data flow between the UE and the application server, wherein the data flow is associated with a QoS guarantee that is based on the required QoS;

determining that, at approximately a first instance in the future, the AN can no longer comply with the QoS guarantee; and sending to the UE a first notification indicating non-compliance with the QoS guarantee, wherein the first notification is sent at least the first safeguard time before the first instance.

2. The method of embodiment 1, further comprising:
receiving, from the core network, a second safeguard time associated with the required QoS; and
after sending the notification of non-compliance, determining that, at approximately a second instance in the future, the AN can again comply with the QoS guarantee.

3. The method of embodiment 2, further comprising sending to the UE a second notification indicating re-compliance with the QoS guarantee, wherein the second notification is sent at least the second safeguard time before the second instance.

4. The method of any of embodiments 1-3, wherein the QoS guarantee associated with the data flow comprises one or more of the following: a guaranteed minimum bit rate, a guaranteed maximum packet delay, and a guaranteed maximum packet error rate.

5. The method of any of embodiments 1-4, wherein the AN comprises an NG-RAN and the core network comprises a 5G core network (5GC).

6. The method of any of embodiments 1-5, wherein the first safeguard time represents the amount of time required by the application, prior to QoS guarantee non-compliance, to control at least one service of the application to facilitate safe operation of the application subsequent to QoS guarantee non-compliance.

7. A method for controlling operation of an application, within a user equipment (UE), based on compliance with a quality-of-service (QoS) guarantee of a data flow between the UE and an application server, the method comprising:
establishing a data flow between the application and the application server via an access network (AN), wherein the data flow is associated with a QoS guarantee that is based on a required QoS associated with the application;
receiving, from the AN, a first notification indicating that, at approximately a first instance in the future, the AN can no longer comply with the QoS guarantee, wherein the first notification is received at least a first safeguard time before the first instance; and
prior to the first instance, controlling at least one service of the application to facilitate safe operation of the application subsequent to the first instance.

8. The method of embodiment 7, further comprising sending, to the core network, an indication of the required QoS and the first safeguard time associated with the required QoS.

9. The method of any of embodiments 7-8, wherein controlling the at least one service, prior to the first instance, comprises disabling or reducing the operating margin for at least one of the following: the at least one service, a subset of the at least one service, and the entire application.

10. The method of any of embodiments 7-9, further comprising:
receiving, from the AN, a second notification indicating that, at approximately a second instance in the future, the AN can again comply with the QoS guarantee, wherein the second notification is received after the first instance and at least the first safeguard time before the second instance; and
prior to the second instance, controlling the at least one service of the application to facilitate safe operation of the application subsequent to the second instance.

11. The method of embodiment 10, wherein controlling the at least one service, prior to the second instance, comprises enabling or increasing the operating margin for at least one of the following: the at least one service, a subset of the at least one service, and the entire application.

12. The method of any of embodiments 7-11, wherein the QoS guarantee associated with the data flow comprises one or more of the following: a guaranteed minimum bit rate, a guaranteed maximum packet delay, and a guaranteed maximum packet error rate.

13. A method for controlling notification of changes to an access network's (AN) compliance with a quality-of-service (QoS) guarantee for a data flow between an application and an application server, the method comprising
sending, to a core network coupled with the AN, a QoS required by the application and a desired first safeguard time associated with the required QoS;
receiving, from the core network, one or more first values of allowable safeguard times in relation to the desired first safeguard time;
selecting a first safeguard time from among the first values; and
sending, to the core network, the first safeguard time.

14. The method of embodiment 13, wherein the first safeguard time represents the amount of time required by the application, prior to AN non-compliance with the QoS guarantee, to control at least one service of the application to facilitate safe operation of the application subsequent to AN non-compliance with the QoS guarantee.

15. The method of any of claims 13-14, further comprising:
sending, to the core network coupled with the AN, a desired second safeguard time associated with the required QoS;
receiving, from the core network, one or more second values of allowable safeguard times in relation to the desired second safeguard time;
selecting a second safeguard time from among the first values; and
sending, to the core network, the second safeguard time.

16. The method of embodiment 15, wherein the second safeguard time represents the amount of time required by the application, prior to AN re-compliance with the QoS guarantee, to control the at least one service of the application to facilitate safe operation of the application subsequent to AN re-compliance with the QoS guarantee.

17. A network node, in an access network (AN), configured to notify a user equipment (UE) of changes to the AN's compliance with a quality-of-service (QoS) guarantee for a data flow between the UE and an application server, the network node comprising:
a communication interface; and
processing circuitry operably coupled to the communication interface and configured to perform any operations of any of embodiments 1-6; and
power supply circuitry configured to supply power to the network node.

18. A user equipment (UE) configured to control operation of an application, within the UE, based on compliance with a quality-of-service (QoS) guarantee of a data flow between the UE and an application server, the UE comprising:
a communication interface; and
processing circuitry operably coupled to the communication interface and configured to perform any operations of any of embodiments 7-12; and
power supply circuitry configured to supply power to the UE.

19. An application server configured to control notification of changes to an access network's (AN) compliance with a quality-of-service (QoS) guarantee for a data flow between an application and an application server, the application server comprising:
  a communication interface; and
  processing circuitry operably coupled to the communication interface and configured to perform any operations of any of embodiments 13-16; and
  power supply circuitry configured to supply power to the application server.

20. A communication system including a host computer comprising:
  processing circuitry configured to provide user data; and
  a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-6.

21. The communication system of the previous embodiment further including the base station.

22. The communication system of the previous two embodiments, further including the UE, wherein the UE is configured to perform any of the operations comprising embodiments 7-12.

23. The communication system of the previous three embodiments, wherein:
  the processing circuitry of the host computer is configured to execute a host application, thereby providing the user data; and
  the UE comprises processing circuitry configured to execute a client application associated with the host application.

24. A method implemented in a communication system including a host computer, a base station, and a User Equipment (UE), the method comprising:
  at the host computer, providing user data; and
  at the host computer, initiating a transmission carrying the user data to the UE via a cellular network comprising the base station;
  at the base station, performing any of the operations comprising any of embodiments 1-6.

25. The method of the previous embodiment, further comprising, at the base station, transmitting the user data.

26. The method of the previous two embodiments, wherein the user data is provided at the host computer by executing a host application, the method further comprising, at the UE, executing a client application associated with the host application.

27. The method of the previous three embodiments, further comprising, at the UE, performing any of the operations comprising any of embodiments 7-12.

28. A communication system including a host computer comprising a communication interface configured to receive user data originating from a transmission from a User equipment (UE) to a base station, wherein the base station comprises a radio interface and processing circuitry, the base station's processing circuitry is configured to perform operations of any of embodiments 1-6.

29. The communication system of the previous embodiment further including the base station.

30. The communication system of the previous two embodiments, further including the UE, wherein the UE is configured to communicate with the base station and to perform any of the operations comprising embodiments 7-12.

31. The communication system of the previous three embodiments, wherein:
  the processing circuitry of the host computer is configured to execute a host application; and
  the UE is configured to execute a client application associated with the host application, thereby providing the user data to be received by the host computer.

32. A non-transitory, computer-readable medium storing computer-executable instructions that, when executed by at least one processing circuit comprising a network node of an access network (AN), configures the network node to perform any of the operations comprising any of embodiments 1-6.

32. A non-transitory, computer-readable medium storing computer-executable instructions that, when executed by at least one processing circuit comprising a user equipment (UE), configures the UE to perform any of the operations comprising any of embodiments 7-12.

33. A non-transitory, computer-readable medium storing computer-executable instructions that, when executed by at least one processing circuit comprising an application server, configures the application server to perform any of the operations comprising any of embodiments 13-16.

The invention claimed is:

1. A network node of an access network (AN) coupled to a core network (CN), the network node configured to notify of changes to the AN's compliance with a quality-of-service (QoS) requirement for a data flow between an application server and an application associated with a user equipment (UE) served by the AN, the network node comprising:
  interface circuitry operable to communicate with the UE and the CN; and
  processing circuitry operably coupled to the interface circuitry, whereby the processing circuitry is configured to:
    receive, via the interface circuitry, from a core network (CN) coupled to the AN, a first safeguard time associated with the QoS requirement, wherein the first safeguard time represents an amount of time required, prior to AN non-compliance with the QoS requirement, to adapt the application for safe operation during the AN non-compliance;
    determine that, at a first instance in the future, the AN is likely to be non-compliant with the QoS requirement; and
    send, to the CN, via the interface circuitry, a first notification indicating a likelihood of future AN non-compliance with the QoS requirement, wherein the first notification is sent at least the first safeguard time before the first instance.

2. The network node of claim 1, wherein the processing circuitry is configured to receive the first safeguard time from the CN by receiving the QoS requirement from the CN, wherein the QoS requirement implicitly indicates the first safeguard time.

3. The network node of claim 1, wherein the processing circuitry is further configured to hand over the data flow to a further AN after sending the first notification, wherein handing over the data flow includes notifying the further AN that the first notification has been sent to the CN.

4. The network node of claim 1, wherein the processing circuitry is further configured to receive, from the CN, a second safeguard time associated with the QoS requirement, wherein the second safeguard time represents an amount of time required, prior to AN re-compliance with the QoS requirement after non-compliance, to adapt the application for safe operation after the AN re-compliance.

5. The network node of claim 4, wherein the processing circuitry is further configured to:
  determine that, at a second instance in the future, the AN is likely to be re-compliant with the QoS requirement, wherein the second instance is after the first instance; and
  send, to the CN, via the interface circuitry, a second notification indicating a likelihood of future AN re-compliance with the QoS requirement, wherein the second notification is sent at least the second safeguard time before the second instance.

6. A network node of a core network (CN) coupled to an access network (AN), the network node configured to monitor the AN's compliance with a quality-of-service (QoS) requirement for a data flow between an application server (AF) and an application associated with a user equipment served by the AN, the network node comprising:
  interface circuitry configured to communicate with the AN and the AF; and
  processing circuitry operably coupled to the interface circuitry, whereby the processing circuitry is configured to:
    receive, from the AF, via the interface circuitry, a first safeguard time associated with the QoS requirement for the data flow, wherein the first safeguard time represents an amount of time required, prior to AN non-compliance with the QoS requirement, to adapt the application for safe operation during the AN non-compliance; and
    send the first safeguard time to the AN, via the interface circuitry.

7. The network node of claim 6, wherein the processing circuitry is further configured to:
  receive, from the AF, via the interface circuitry, a desired first safeguard time associated with the QoS requirement;
  send, to the AF, via the interface circuitry, one or more allowable first safeguard times in relation to the desired first safeguard time; and
  subsequently receive the first safeguard time, via the interface circuitry, wherein the received first safeguard time is one of the allowable first safeguard times.

8. The network node of claim 6, wherein the processing circuitry is configured to send the first safeguard time to the AN by sending the QoS requirement to the AN, wherein the QoS requirement implicitly indicates the first safeguard time.

9. The network node of claim 6, wherein the processing circuitry is further configured to receive, from the AN, via the interface circuitry, a first notification indicating that, at a first instance in the future, the AN is likely to be non-compliant with the QoS requirement.

10. The network node of claim 9, wherein the processing circuitry is further configured to send the first notification to the AF, via the interface circuitry, wherein the first notification is sent at least the first safeguard time before the first instance.

11. The network node of claim 6, wherein the processing circuitry is further configured to receive, from the AF, via the interface circuitry, a second safeguard time associated with the QoS requirement, wherein the second safeguard time represents an amount of time required, prior to AN re-compliance with the QoS requirement after non-compliance, to adapt the application for safe operation after the AN re-compliance.

12. The network node of claim 11, wherein the processing circuitry is further configured to:
  receive, from the AF, via the interface circuitry, a desired second safeguard time associated with the QoS requirement;
  send, to the AF, via the interface circuitry, one or more allowable second safeguard times in relation to the desired second safeguard time; and
  subsequently receive the second safeguard time via the interface circuitry, wherein the received second safeguard time is one of the allowable second safeguard times.

13. The network node of claim 11, wherein the processing circuitry is further configured to receive, from the AN, via the interface circuitry, a second notification indicating that, at a second instance in the future, the AN is likely to be re-compliant with the QoS requirement.

14. The network node of claim 13, wherein the processing circuitry is further configured to send the second notification to the AF, via the interface circuitry, wherein the second notification is sent at least the second safeguard time before the second instance.

15. An application server comprising:
  interface circuitry configured to communicate with an application via a core network (CN) and an access network (AN); and
  processing circuitry operably coupled to the interface circuitry, whereby the processing circuitry is configured to:
    determine a first safeguard time associated with a quality-of-service (QoS) requirement for a data flow between the application server and an application associated with a user equipment served by the AN, wherein the first safeguard time represents an amount of time required, prior to AN non-compliance with the QoS requirement, to adapt the application for safe operation during the AN non-compliance; and
    send the determined first safeguard time to the CN via the interface circuitry.

16. The application server of claim 15, wherein the processing circuitry is configured to send the determined first safeguard time to the CN by sending the QoS requirement to the CN, wherein the QoS requirement implicitly indicates the first safeguard time.

17. The application server of claim 15, wherein the processing circuitry is configured to determine the first safeguard time by:
  sending, to the CN, a desired first safeguard time associated with the QoS requirement;
  receive, from the CN, one or more allowable first safeguard times in relation to the desired first safeguard time; and
  select the first safeguard time from among the allowable first safeguard times.

18. The application server of claim 15, wherein the processing circuitry is further configured to:
  determine a second safeguard time associated with the QoS requirement for the data flow, wherein the second safeguard time represents an amount of time required, prior to AN re-compliance with the QoS requirement after non-compliance, to adapt the application for safe operation after the AN re-compliance; and
  send, to the CN, via the interface circuitry, the determined second safeguard time.

19. The application server of claim 18, wherein the processing circuitry is configured to determine the second safeguard time by:

sending, to the CN, via the interface circuitry, a desired second safeguard time associated with the QoS requirement;

receiving, from the CN, via the interface circuitry, one or more allowable second safeguard times in relation to the desired second safeguard time; and selecting the second safeguard time from among the allowable second safeguard times.

20. The application server of claim 15, wherein the processing circuitry is further configured to receive, from the CN, via the interface circuitry, a first notification indicating that, at a first instance in the future, the AN is likely to be non-compliant with the QoS requirement, wherein the first notification is received at least the first safeguard time before the first instance.

21. The application server of claim 20, wherein the processing circuitry is further configured to, in response to the first notification and prior to the first instance, control at least one service of the application to facilitate safe operation of the application subsequent to first instance, by disabling or reducing an operating margin for at least one of the following: the at least one service, a subset of the at least one service, and the entire application.

22. The application server of claim 20, wherein the processing circuitry is further configured to:

receive, from the AN, via the interface circuitry, a second notification indicating that, at a second instance in the future, the AN is likely to be re-compliant with the QoS requirement, wherein the second notification is received after the first instance and at least the second safeguard time before the second instance; and in response to the second notification and prior to the second instance, control at least one service of the application to facilitate safe operation of the application subsequent to the second instance, by enabling or increasing an operating margin for at least one of the following: the at least one service, a subset of the at least one service, and the entire application.

23. The application server of claim 15, wherein the QoS requirement for the data flow includes one or more of the following: a guaranteed minimum bit rate, a guaranteed maximum packet delay, and a guaranteed maximum packet error rate.

24. A method, performed by an access network (AN), for notifying of changes to the AN's compliance with a quality-of-service (QoS) requirement for a data flow between an application server and an application associated with a user equipment served by the AN, the method comprising:

receiving, from a core network (CN) coupled to the AN, a first safeguard time associated with the QoS requirement, wherein the first safeguard time represents an amount of time required, prior to AN non-compliance with the QoS requirement, to adapt the application for safe operation during the AN non-compliance;

determining that, at a first instance in the future, the AN is likely to be non-compliant with the QoS requirement; and sending, to the CN, a first notification indicating a likelihood of future AN non-compliance with the QoS requirement, wherein the first notification is sent at least the first safeguard time before the first instance.

25. A method, performed by a core network (CN) coupled to an access network (AN), for monitoring the AN's compliance with a quality-of-service (QoS) requirement for a data flow between an application server (AF) and an application associated with a user equipment served by the AN, the method comprising:

receiving, from the AF, a first safeguard time associated with the QoS requirement for the data flow, wherein the first safeguard time represents an amount of time required, prior to AN non-compliance with the QoS requirement, to adapt the application for safe operation during the AN non-compliance; and sending the first safeguard time to the AN.

26. A method, performed by an application server (AF), for monitoring an access network (AN) compliance with a quality-of-service (QoS) requirement for a data flow between the application server and an application associated with a user equipment served by the AN, the method comprising:

determining a first safeguard time associated with the QoS requirement for the data flow, wherein the first safeguard time represents an amount of time required, prior to AN non-compliance with the QoS requirement, to adapt the application for safe operation during the AN non-compliance; and sending the determined first safeguard time to a core network (CN) coupled with the AN.

* * * * *